(12) United States Patent
Larson et al.

(10) Patent No.: US 12,454,854 B2
(45) Date of Patent: Oct. 28, 2025

(54) INSERT MOLDED TORSION BAR HINGE

(71) Applicant: Reell Precision Manufacturing Corporation, St. Paul, MN (US)

(72) Inventors: George Larson, Roseville, MN (US); Jeffrey Randall, Hugo, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 0 days.

(21) Appl. No.: 18/719,197

(22) PCT Filed: Dec. 13, 2022

(86) PCT No.: PCT/US2022/052752
§ 371 (c)(1),
(2) Date: Jun. 12, 2024

(87) PCT Pub. No.: WO2023/114237
PCT Pub. Date: Jun. 22, 2023

(65) Prior Publication Data
US 2025/0043610 A1 Feb. 6, 2025

Related U.S. Application Data

(60) Provisional application No. 63/289,030, filed on Dec. 13, 2021.

(51) Int. Cl.
*E05F 1/12* (2006.01)
*B29C 45/00* (2006.01)
(Continued)

(52) U.S. Cl.
CPC .......... *E05F 1/123* (2013.01); *B29C 45/0017* (2013.01); *B29C 45/14549* (2013.01); *B29L 2031/22* (2013.01); *E05Y 2201/486* (2013.01)

(58) Field of Classification Search
CPC ................. E05F 1/123; B29C 45/0017; B29C 45/14549; B29L 2031/22; E05Y 2201/486
See application file for complete search history.

(56) References Cited

U.S. PATENT DOCUMENTS

| | | | | |
|---|---|---|---|---|
| 251,591 | A | * 12/1881 | Jaeger | E05D 1/00 220/827 |
| 434,212 | A | * 8/1890 | Taxis | E05F 1/123 16/308 |

(Continued)

FOREIGN PATENT DOCUMENTS

| | | | | |
|---|---|---|---|---|
| CN | 212 723 785 | | 3/2021 | |
| DE | 19629030 A1 | * | 2/1997 | ............ E05F 1/1238 |

(Continued)

OTHER PUBLICATIONS

International Search Report and Written Opinion in PCT/US2022/052752 dated Jun. 1, 2023.

*Primary Examiner* — Jeffrey O'Brien
(74) *Attorney, Agent, or Firm* — Dicke, Billig & Czaja, PLLC

(57) ABSTRACT

One aspect is an insert molded torsion bar hinge including a cylindrical metal torsion bar with a main bar body, a portion of which extends along a torsion bar axis, a first contoured bar end and a second contoured bar end on opposite ends of the main bar body. A first hinged element of molded plastic and with a first knuckle, is molded directly over and encompasses the first contoured bar end such that the first contoured bar end is fixed within and not rotatable relative to the first hinged element. The first knuckle is molded directly over and encompassing a portion of the main bar body. A second hinged element of molded plastic and with a second knuckle is molded directly over and encompasses the second contoured bar end such that the second contoured bar end is fixed within and not rotatable (Continued)

relative to the second hinged element. The second knuckle is molded directly over and encompassing a portion of the main bar body. The first and second hinged elements rotate and produce a torsional spring torque.

19 Claims, 31 Drawing Sheets

(51) Int. Cl.
*B29C 45/14* (2006.01)
*B29L 31/22* (2006.01)

(56) References Cited

U.S. PATENT DOCUMENTS

| | | | | |
|---|---|---|---|---|
| 962,426 | A * | 6/1910 | Hansen | E05F 1/123 16/308 |
| 2,482,920 | A * | 9/1949 | Levi | A24F 15/12 220/326 |
| 3,000,049 | A * | 9/1961 | Terry, Jr. | B29C 45/0017 16/334 |
| 3,307,734 | A * | 3/1967 | Campbell | B65F 1/1623 16/75 |
| 3,490,756 | A * | 1/1970 | Spier | F16F 1/16 16/75 |
| 3,562,852 | A * | 2/1971 | Gutshall | E05F 1/123 16/257 |
| 4,285,098 | A * | 8/1981 | Hicks | E05D 11/1042 16/308 |
| 4,630,178 | A * | 12/1986 | Mugford | B60Q 1/05 362/512 |
| 5,228,240 | A * | 7/1993 | Barroero | F25D 23/087 49/478.1 |
| 5,382,108 | A * | 1/1995 | Ojima | A45C 11/24 16/376 |
| 5,644,516 | A * | 7/1997 | Podwalny | G06F 1/1679 361/679.26 |
| 5,687,509 | A * | 11/1997 | Barroero | E05D 7/0045 49/386 |
| 5,730,239 | A * | 3/1998 | Holter | B62D 25/12 49/386 |
| 5,771,539 | A * | 6/1998 | Wahlstedt | F16D 7/022 16/342 |
| 5,771,540 | A * | 6/1998 | Carpenter | G06F 1/1616 16/308 |
| 5,787,549 | A * | 8/1998 | Soderlund | E05F 1/123 49/386 |
| 6,619,723 | B2 * | 9/2003 | Duffy | B60P 7/135 16/369 |
| 6,648,398 | B2 * | 11/2003 | Duffy | B60P 3/39 16/369 |
| 7,156,450 | B2 * | 1/2007 | McIntyre | E05F 1/1238 296/76 |
| 7,210,199 | B2 * | 5/2007 | Clark | E05D 5/06 16/319 |
| 7,743,466 | B2 * | 6/2010 | Tu | G06F 1/1616 16/308 |
| 8,265,231 | B2 | 9/2012 | Otani et al. | |
| 8,780,570 | B2 * | 7/2014 | Bohn | H04M 1/0218 361/728 |
| 10,648,209 | B2 * | 5/2020 | Sedivy | H02G 3/0418 |
| 11,408,215 | B2 * | 8/2022 | Lindberg | B22D 19/12 |
| 2008/0134466 | A1 * | 6/2008 | Massengill | B29C 45/0017 16/386 |
| 2009/0159593 | A1 * | 6/2009 | Apps | B65D 11/1833 220/6 |
| 2022/0098908 | A1 * | 3/2022 | Im | E05F 1/1033 |

FOREIGN PATENT DOCUMENTS

| | | | | |
|---|---|---|---|---|
| GB | 2060049 | A * | 4/1981 | E05F 1/1238 |
| JP | S6116223 | Y2 * | 5/1986 | |
| JP | H11-346825 | | 12/1999 | |
| JP | 2000-337016 | | 12/2000 | |
| JP | 2003-87686 | | 10/2004 | |
| JP | 2010215135 | A * | 9/2010 | |
| KR | 20120056558 | A * | 6/2012 | E05F 15/70 |

* cited by examiner

INSERT MOLDED TORSION BAR HINGE

CROSS-REFERENCE TO RELATED APPLICATIONS

This Utility Patent Application claims priority under 35 U.S.C. § 371 to International Application Serial No. PCT/US2022/052752, filed Dec. 13, 2022, which claims priority to U.S. Application Ser. No. 63/289,030, filed Dec. 13, 2021, both of which are incorporated herein by reference in its entirety

BACKGROUND

Torsion hinges are commonly used for many applications and come in many varieties throughout industry. One example is a piano hinge with coiled torsion springs inserted on the hinge axis. These hinges are commonly made with stamped and formed sheet metal brackets where the coil spring includes neutral angle tolerance and remains visible with cosmetic and exposure impacts to the product. Another example is a torsion bar hinge designs that also typically require stamping the hinge leaves separately and forming a torsion bar and crimping the hinge leaf after assembly, potentially adding free play, adding neutral angle tolerance and again complicating assembly. Other metal torsion spring hinges are also made with coiled torsion springs inside of a hinge barrel, which leads to larger diameter requirements. Some of these hinges are commonly made with stamped and formed sheet metal brackets that have to be attached to the larger plastic molded hinge leaves. This requires multiple additional parts and additional assembly steps. Because of these shortcomings, there is a need for a compact torsion spring hinge design that provides torsional spring torque without the addition of sleeves or bushings. There is also a need to eliminate riveting and forming operations and have the functional and cosmetic benefits. For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the invention. The following detailed description, therefore, is not to be taken in a limiting sense, and the scope of the invention is defined by the appended claims.

It is to be understood that the features of the various exemplary embodiments described herein may be combined with each other, unless specifically noted otherwise.

Figure 1A:
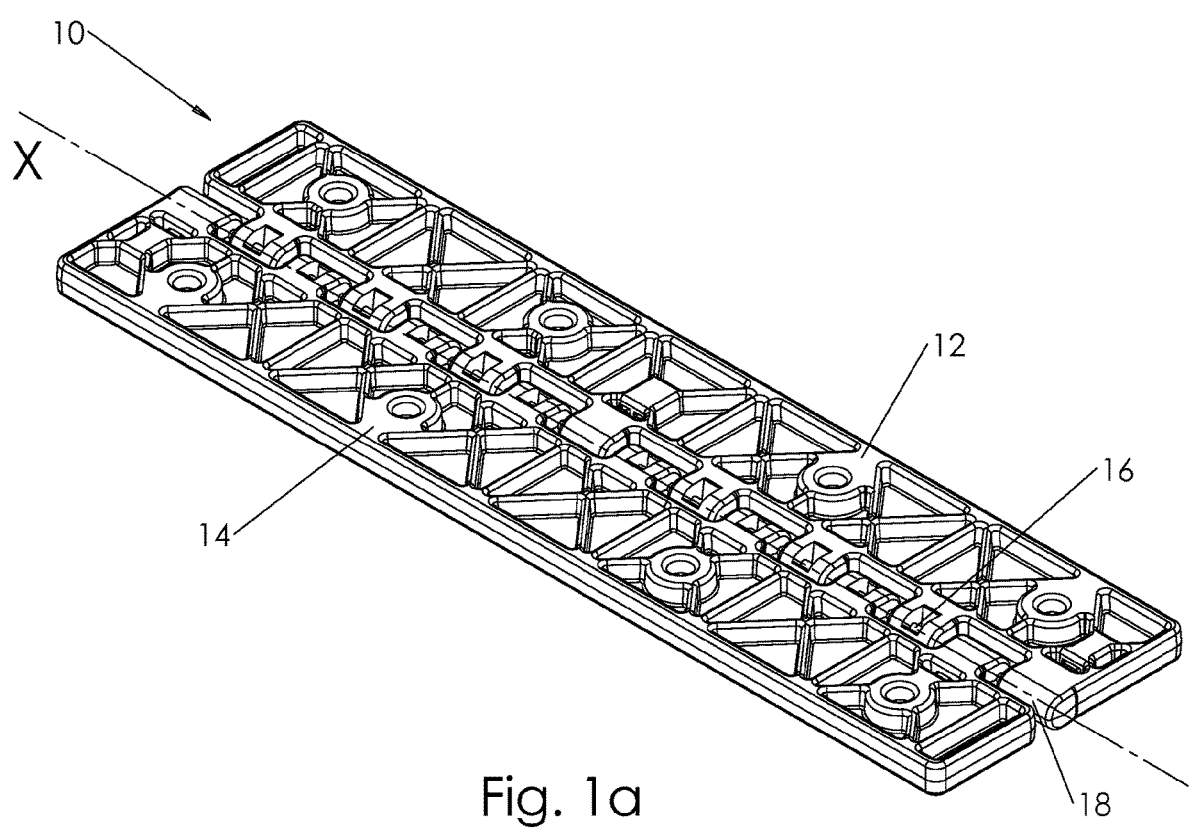
FIGS. 1a-1b illustrate an insert molded torsion bar hinge in accordance with one embodiment.
Figure 1B:
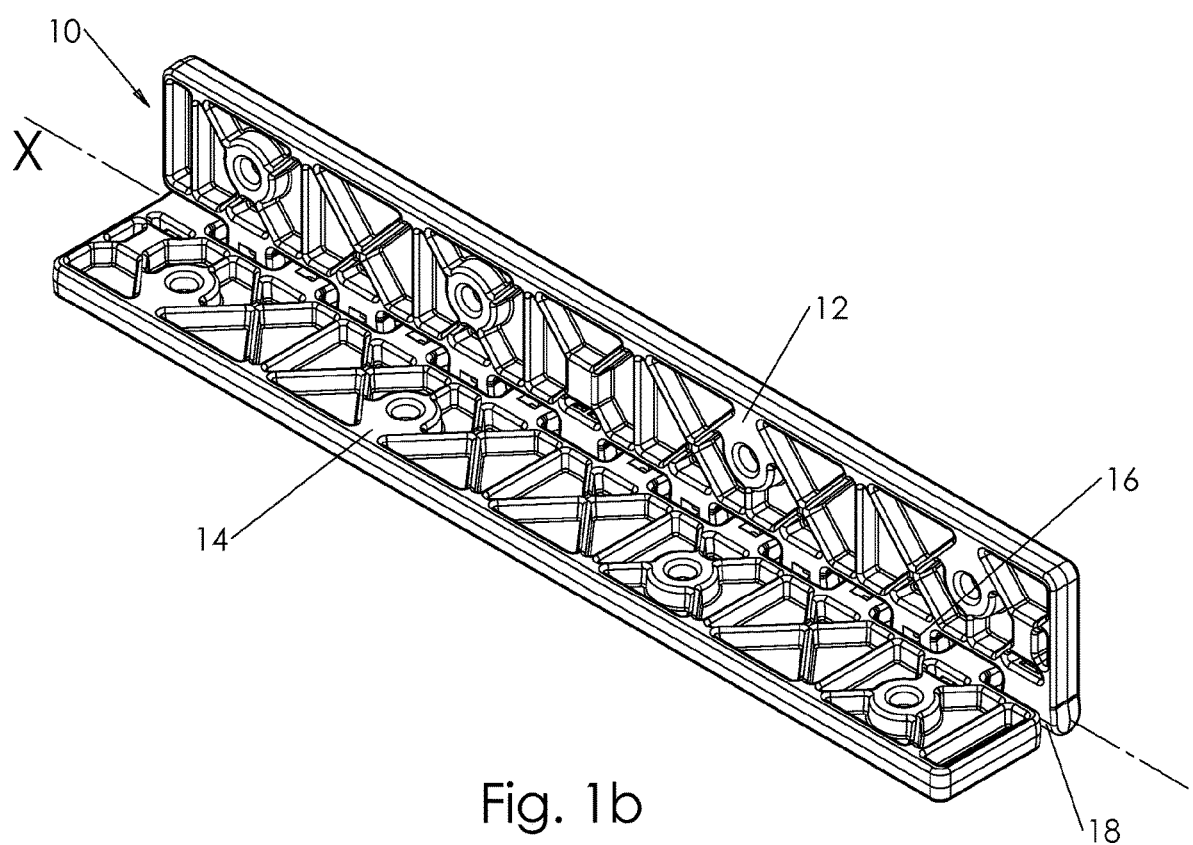
Figure 1C:
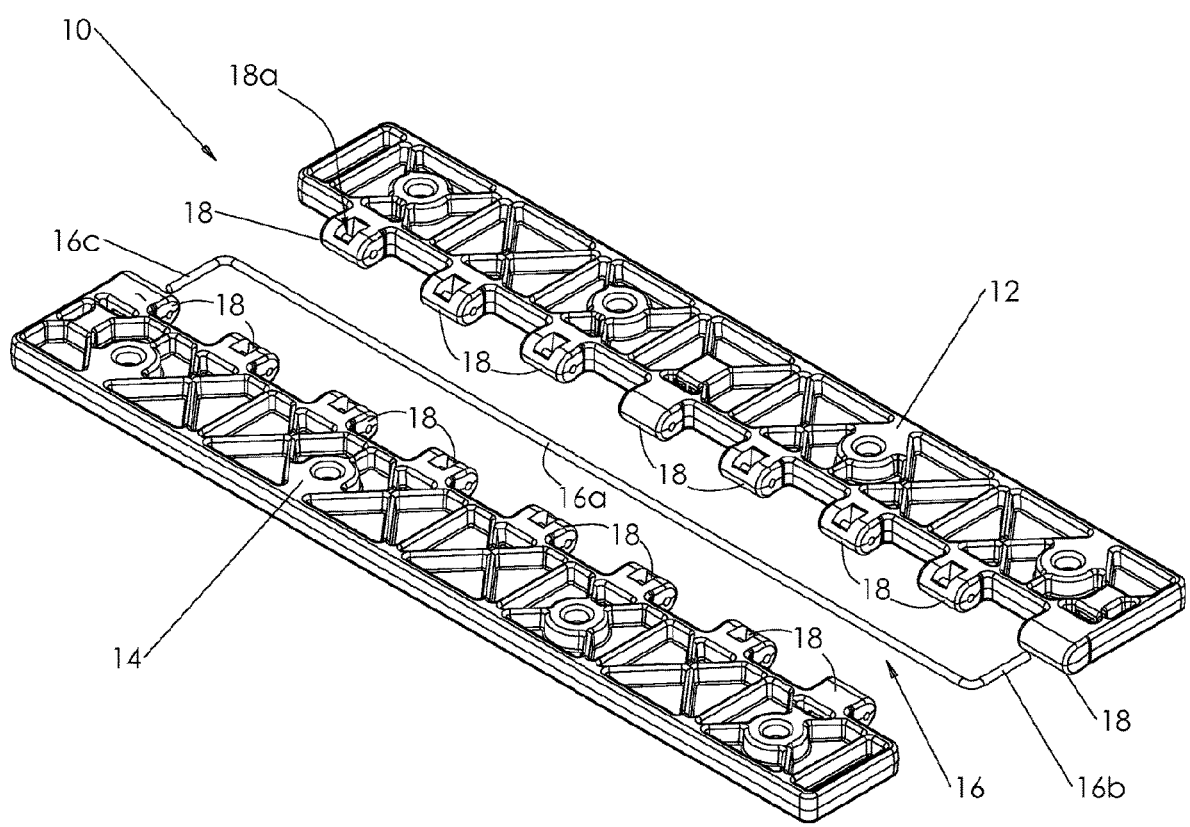
FIG. 1c illustrates an exploded view of an insert molded torsion bar hinge in accordance with one embodiment.

FIGS. 1a-1b illustrate insert molded torsion bar hinge 10 in accordance with one embodiment. FIG. 1c illustrates an exploded view of insert molded torsion bar hinge 10 in accordance with one embodiment. In one embodiment, insert molded torsion bar hinge 10 includes first hinged element 12, second hinged element 14, torsion bar 16, and knuckles 18. Torsion bar 16 includes main bar body 16a, first end 16b, and second end 16c. In one embodiment, first and second hinged elements 12 and 14 are rotated relative to each other along main torsion hinge axis X, and torsion bar 16 provides torsional spring torque for insert molded torsion bar hinge 10.

In one embodiment, first end 16b of torsion bar 16 is completely embedded within first hinged element 12 and second end 16c of torsion bar 16 is completely embedded within second hinged element 14, while alternating knuckles 18 from first and second hinged elements 12 and 14 extend about sections of main bar body 16a. As such, when first and second hinged elements 12 and 14 are rotated relative to each other, such as when first hinged element 12 is rotated from its "flat" position in FIG. 1a to a "near vertical" position in FIG. 1b, first end 16b of torsion bar 16 is rotated with first hinged element 12, while second end 16c is held in place. This rotation of the ends of torsion bar 16 produces the torsional spring torque for insert molded torsion bar hinge 10.

In one embodiment, the position of first and second hinged elements 12 and 14 in FIG. 1a is a neutral spring position. In that position, first and second ends 16b and 16c of torsion bar 16 are not flexed, but are in a relaxed state. As second hinged element 12, and accordingly second end 16b, are rotated to the near vertical position illustrated in FIG. 1b, torsion bar 16 moves from its neutral relaxed state to a flexed state.

In embodiment, first and second ends 16b and 16c are contoured such that they are respectively fixed to first and second hinged elements 12 and 14. In one embodiment, while main bar body 16a extends along main torsion hinge axis X, first and second ends 16b and 16c are contoured to extend in non-parallel directions from main torsion hinge axis X such that when respectively embedded within first and second hinged elements 12 and 14, they will be fixed to and rotate with the first and second hinged elements 12 and 14. Other configurations for contouring first and second ends 16b and 16c in order to secure them to first and second hinged elements 12 and 14 are possible, as will be discussed further below.

In one embodiment, insert molded torsion bar hinge 10 is formed in an injection molding process in which molten material is injecting into a mold cavity. Injection molding can be performed with a host of materials, including thermoplastic and thermosetting polymers. Material for the mold part is fed into a heated barrel, mixed, and injected into a mold cavity, where it cools and hardens to the configuration of the cavity.

Figure 1D:
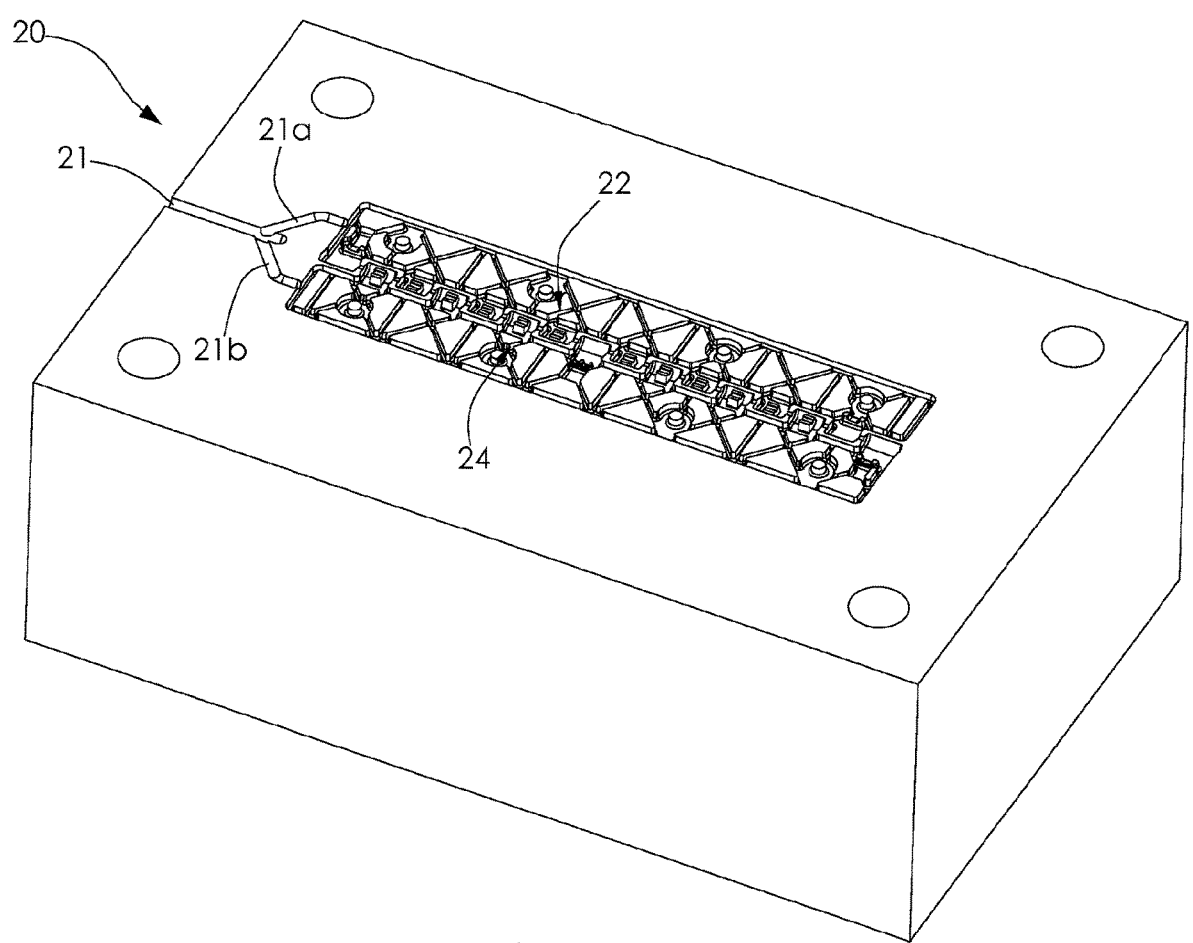
FIG. 1d illustrates a mold cavity for forming the insert molded torsion bar hinge in FIGS. 1a-1c.

FIG. 1d illustrates a mold cavity 20 used for forming insert molded torsion bar hinge 10. First, torsion bar 16 is placed into a mold cavity 20. In one embodiment, the mold cavity has first and second mold cavity parts 22 and 24, which are respectively negative images of the first and second hinge elements 12 and 14 illustrated in FIG. 1b. The first end 16b of torsion bar 16 is placed within the first mold cavity part 22, which forms first hinged element 12, while second end 16c is placed within the second mold cavity part 24, which forms second hinged element 14. Within the mold cavity 22, torsion bar main bar body 16a alternates between the first and second mold cavity parts 22 and 24, where knuckles 18 are formed over the main bar body 16a. In one embodiment, half of knuckles 18 formed over of torsion bar 16 are part of first hinge element 12 and formed in first mold cavity part 22, and the other half of knuckles 18 formed over of torsion bar 16 are part of second hinge element 14 and formed in second mold cavity part 24. Other combinations are also possible, where one of the hinged elements have more knuckles 18 than the other.

In one embodiment, first and second hinge elements 12 and 14 can include a wide variety of attachment features without added cost to the parts by simply including them into the mold cavity. These features can include screw clearance holes, snap fits, adhesive pads, studs and other common methods. Each hinge element can also include cosmetic contours and shapes along with chosen rib/thickness for structural support, various plastic colors or textures to avoid extra parts or processing currently required to make a torsion spring hinge product.

In one embodiment, insert molded torsion bar hinge 10 is formed in a single shot of molding material into first and second mold cavity parts 22 and 24 of the mold cavity 20. A main runner 21 supplies hot molding material, which is then diverted into both first and second mold cavity parts 22 and 24 via runners 21a and 21b. Formation of insert molded torsion bar hinge 10 with a single shot into first and second mold cavity parts 22 and 24 and over torsion bar 16 greatly simplifies the manufacturing process, limits the part count and creates a stable and consistent performing torsion hinge device. As mold material flows into each of first and second mold cavity parts 22 and 24, it completely surrounds and encapsulates first end 16b in first hinged element 12 and completely surrounds and encapsulates second end 16c in second hinged element 14. The mold material then freezes in place with cooling and isolates the torsion bar first and second ends 16b and 16c, such that there is no free play between first hinged element 12 and first end 16b or between second hinged element 14 and second end 16c. In one embodiment, torsion bar 16 is secured exclusively with the molded material forming first and second hinged elements 12 and 14. In this way, insert molded torsion bar hinge 10 is a simpler hinge with no need for attaching additional parts or needing to secure other devices.

For previous configurations of torsion hinges, where hinge parts are stamped and formed sheet metal brackets, a torsion bar is bent into position with the hinge parts, and a gap needs to be left in the hinge parts in order to accommodate bending and then placing the bar into the hinge part. However, since first and second hinged elements 12 and 14 are molded around torsion bar 16, no gap or opening is needed, and instead, the mold material completely surrounds and encompasses first and second ends 16b and 16c for insert molded torsion bar hinge 10.

Furthermore, molding directly around torsion bar 16 dictates that the mold position sets the neutral angle of the spring hinge. This removes product variation that is typical with prior systems, which bend the torsion bar into its neutral position or use wound coil springs, thereby causing some level of variation from product to product. Mold 22 is configured with a desired neutral angle and some allowance is included for the ends 16b and 16c. Accordingly, when the molten plastic encompasses ends 16b and 16c, it fills in any gaps from the torsion bar tolerance, providing a consistent outcome from product to product.

Figure 1E:
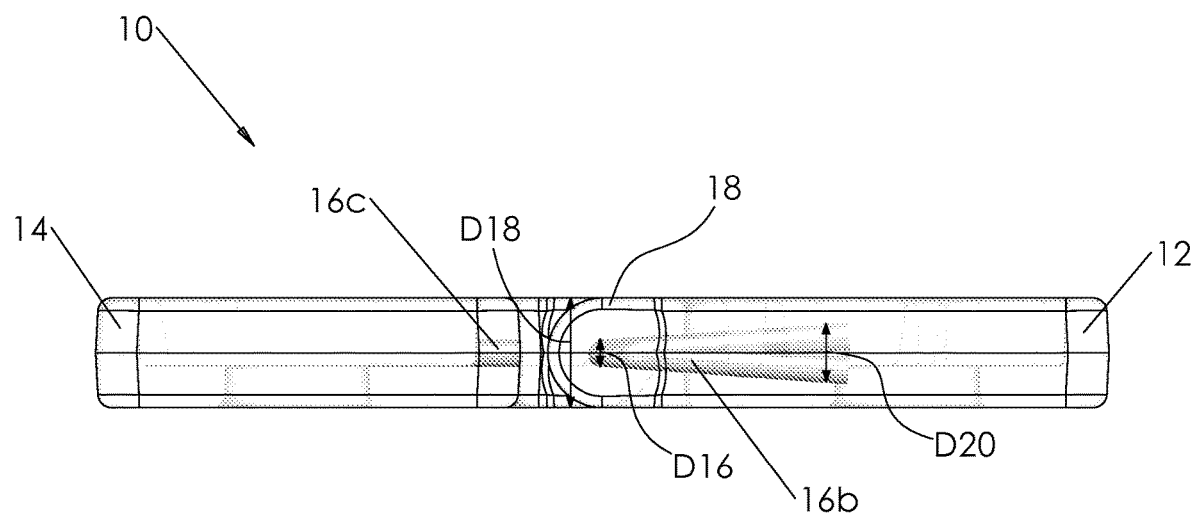
FIG. 1e illustrates a partially ghosted sectional side view of an insert molded torsion bar hinge in accordance with one embodiment.

FIG. 1e is a partially ghosted sectional side view of the insert molded torsion bar hinge 10 in accordance with one embodiment. First hinged element 12 is partially ghosted so that first end 16b is visible extending within first hinged element 12. Also, knuckle 18 is illustrated in an area between first and second hinged elements 12 and 14. In one embodiment, torsion bar 16 has an outer diameter $D_{16}$ of 0.080 inches and made of a metal. In one embodiment, knuckle 18 is a molded plastic material and has an outer diameter $D_{18}$ of 8 mm. In order to ensure that insert molded torsion bar hinge 10 has consistent performance and withstands strains of use, in one embodiment, the outer diameter $D_{18}$ of knuckle 18 is between 2 to 6 times the outer diameter $D_{16}$ of torsion bar 16. In another embodiment, the outer diameter $D_{18}$ of knuckle 18 is 1 mm to 8 mm larger than outer diameter $D_{16}$ of torsion bar 16.

In addition, FIG. 1e illustrates how insert molded torsion bar hinge 10 provides tolerance for torsion bar 16 during its manufacturing. First end 16b is illustrated with a variance $D_{20}$ for its angular position. Because of imperfections in the formation process, torsion bar 16 may not be perfectly straight. Depending on its formation, torsion bar may be angled slightly down, mostly horizontal or may be angled slightly up as it is positioned in the mold cavity during formation. However, once molding material is flowed in and encases first end 16b, its relative angular position does not affect the performance of insert molded torsion bar hinge 10, since its neutral position is set by the relative positions of first and second hinged elements 12 and 14. The same is true for the relative angular position of second end 16c.

Figure 1F:
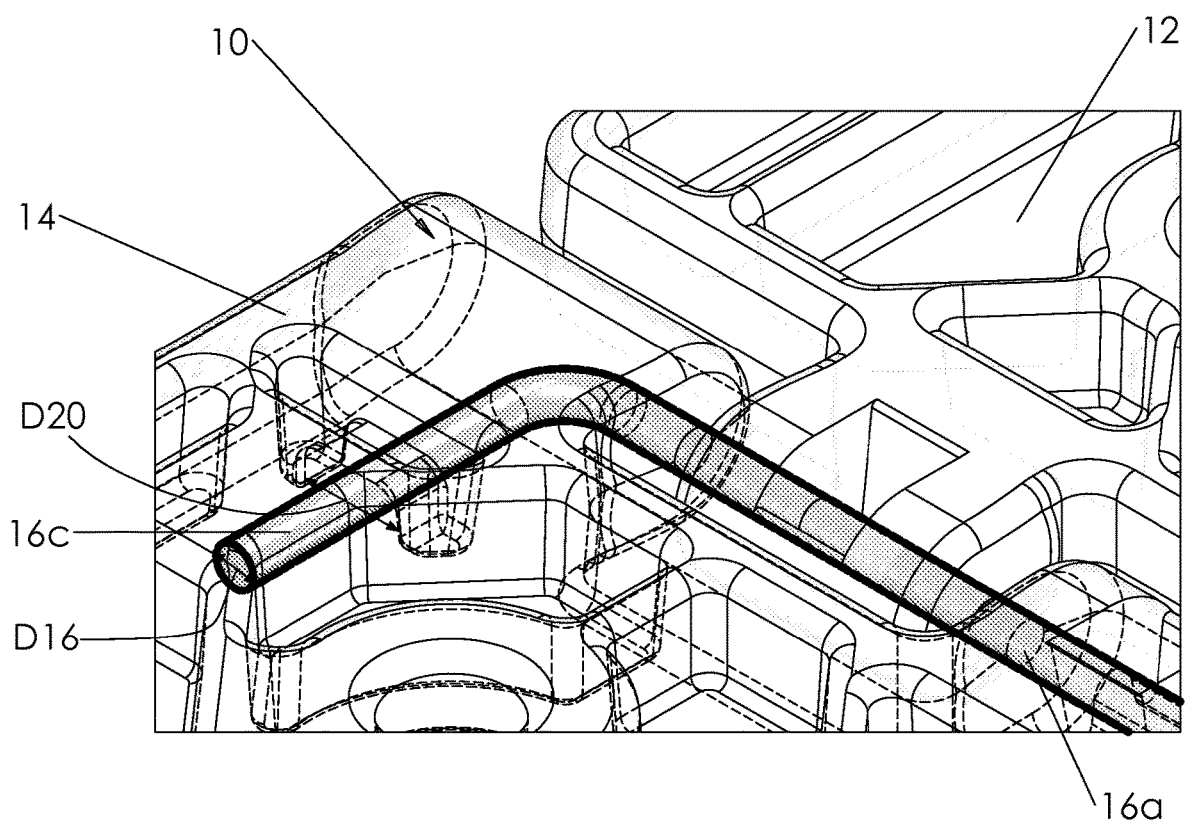
FIG. 1f illustrates a partially ghosted detailed view of a portion of an insert molded torsion bar hinge in accordance with one embodiment.

FIG. 1f illustrates a partially ghosted detailed view of a portion of insert molded torsion bar hinge 10 in accordance with one embodiment. Second end 16c of torsion bar 16 is fully secured in the molded material that forms second hinged element 14 and main bar body 16a extends through molded material that forms knuckles 18 (in both first and second hinged elements 12 and 14). Main bar body 16a is cylindrically shaped, such that as first and second hinged elements 12 and 14 are rotated about main torsion hinge axis X, main bar body 16a rotates relatively freely within knuckles 18. However, because second end 16c extends in a non-parallel direction relative to main torsion hinge axis X, and because it is completely embedded within the molded material of second hinged element 14, second end 16c remains fixed within second hinged element 14 as first and second hinged elements 12 and 14 are rotated about main torsion hinge axis X. As will be further illustrated, torsion bar ends 16b and 16c may be deformed or modified by a variety of methods to allow the molding process to secure them in hinged elements 12 and 14.

As is also visible in FIG. 1f, there is also a build in tolerance as to the length of torsion bar 16. Just as angular position may not always be exact as mentioned above, so too may the length of torsion bar 16 vary slightly along $D_{20}$. Again, however, mold cavity 20 will accommodate these slight variations and when mold material flows in and around second end 16c, it will be secured within second housing 14.

Figure 1G:
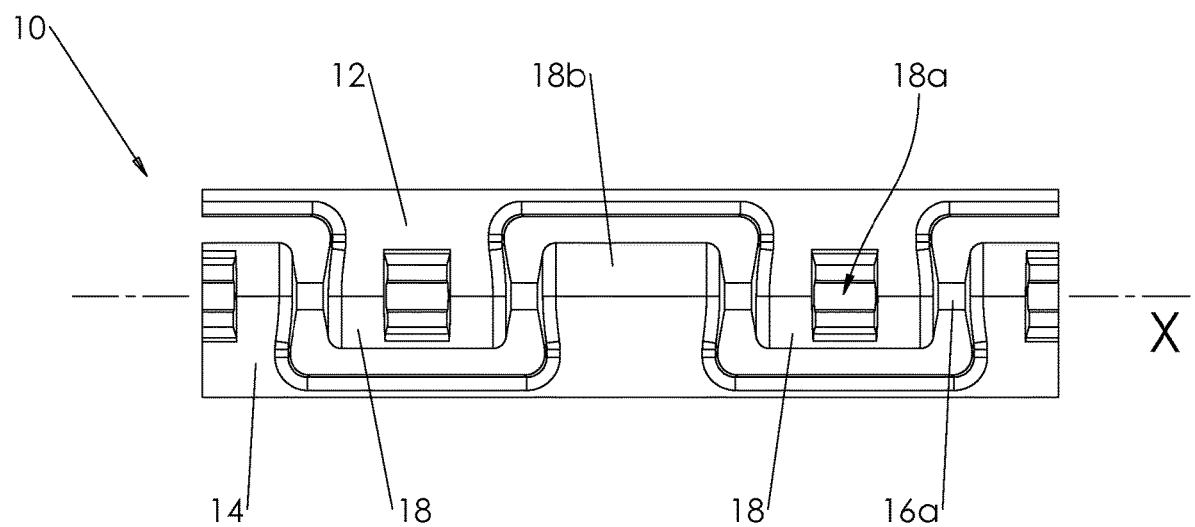
FIG. 1g illustrates a detailed view of a portion of an insert molded torsion bar hinge in accordance with one embodiment.

FIG. 1g illustrates a detailed view of a portion of insert molded torsion bar hinge 10. In one embodiment, alternating knuckles 18 are formed in each of first and second hinged elements 12 and 14, with main bar body 16a of torsion bar 16 secured in the molding material of each knuckle 18. FIG. 1g illustrates knuckles 18 formed by the molding process of first and second hinged elements 12 and 14. In one embodiment, the number of knuckles 18 provided in first and second hinged elements 12 and 14 to support torsion bar 16 is dependent on the torque and motion requirements of torsion bar 16. In one embodiment, there are at least two knuckles 18 for each torsion bar 16.

In one embodiment, torsion bar 16 is configured to slip within each knuckle 18 in order to allow hinge motion and torsional spring energy to be stored in the torsion bar 16 of insert molded torsion bar hinge 10. The knuckles 18 that are nearest first end 16b within hinge element 12 will have less relative motion relative to the torsion bar surface than will knuckle 18 positioned toward the middle of main bar 16a. The knuckles 18 furthest from the end 16b within hinge element 12 will have more relative motion. The same is true for second end 16c within hinge element 14. The plastic of the knuckles 18 that is in contact with the torsion bar 16 surface is typically configured to have a low friction coefficient, a low radius, and a low pressure from the plastic molding shrinkage. While there is some frictional torque between the knuckle 18 and the torsion bar 16, it is typically configured to be much lower than the spring torque generated in the torsion bar 16 due to its twisting rotation.

In one embodiment, it may be desirable to adjust the frictional torque between the knuckle 18 and the torsion bar 16. This may be done in several configurations according to alternative embodiments. In one embodiment, frictional torque between the knuckle 18 and the torsion bar 16 is adjusted by providing notch out 18a in knuckle 18. In one embodiment, molded plastic material is removed to form notch out 18a in knuckle 18. In another, the mold cavity is adjusted so that notch out 18a is formed as part of forming knuckle 18. In either case, there is less frictional torque between the knuckle 18 and the torsion bar 16 where notch out 18a is provided, compared to a solid-filled 18b knuckle 18. In addition, the surface finish of torsion bar 16 can be adjusted to increase or decrease friction. Also, plastic material choices, plastic additives and torsion bar coatings may be used to adjust friction torque as well.

Figure 2A:
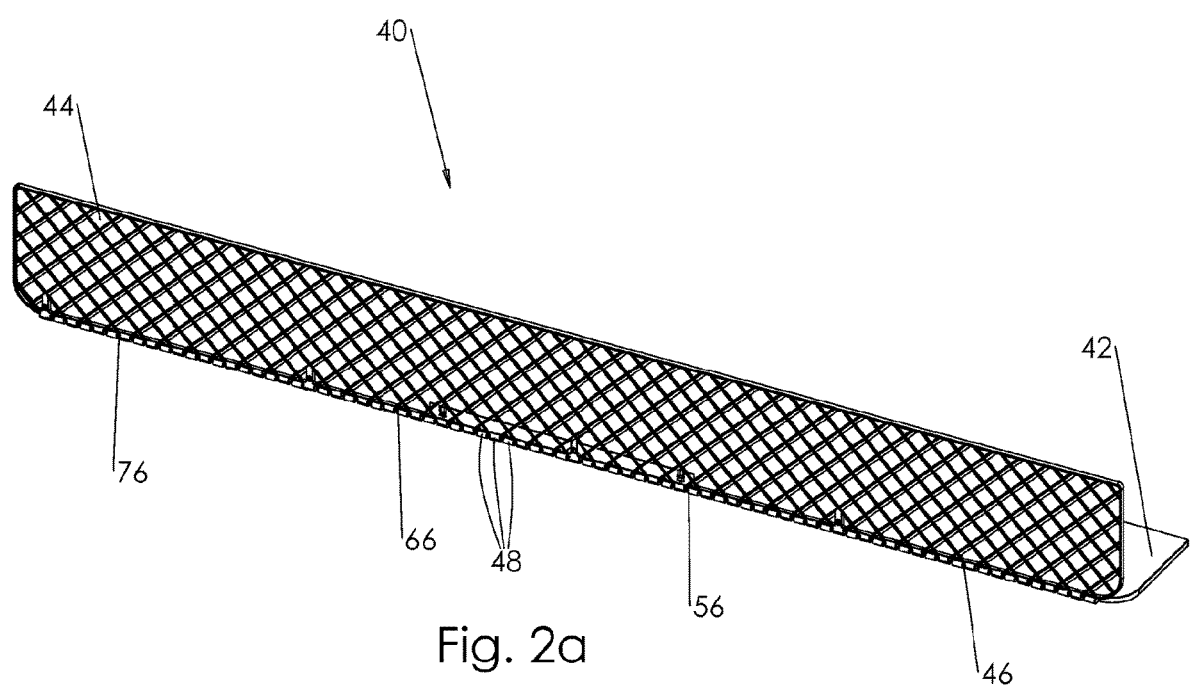
FIG. 2a illustrates an insert molded torsion bar hinge in accordance with one embodiment.
Figure 2B:
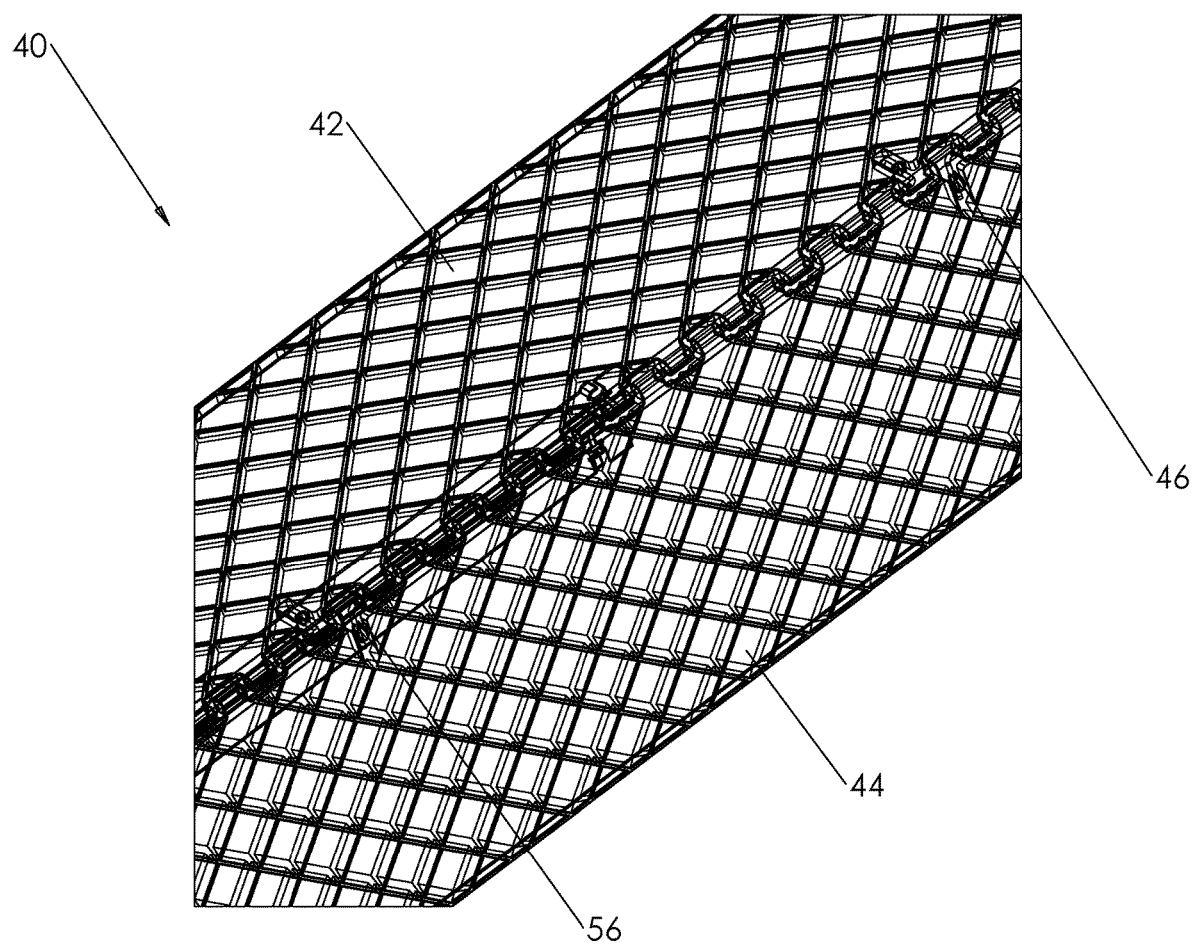
FIG. 2b illustrates a detailed view of an insert molded torsion bar hinge in accordance with one embodiment.
Figure 2C:
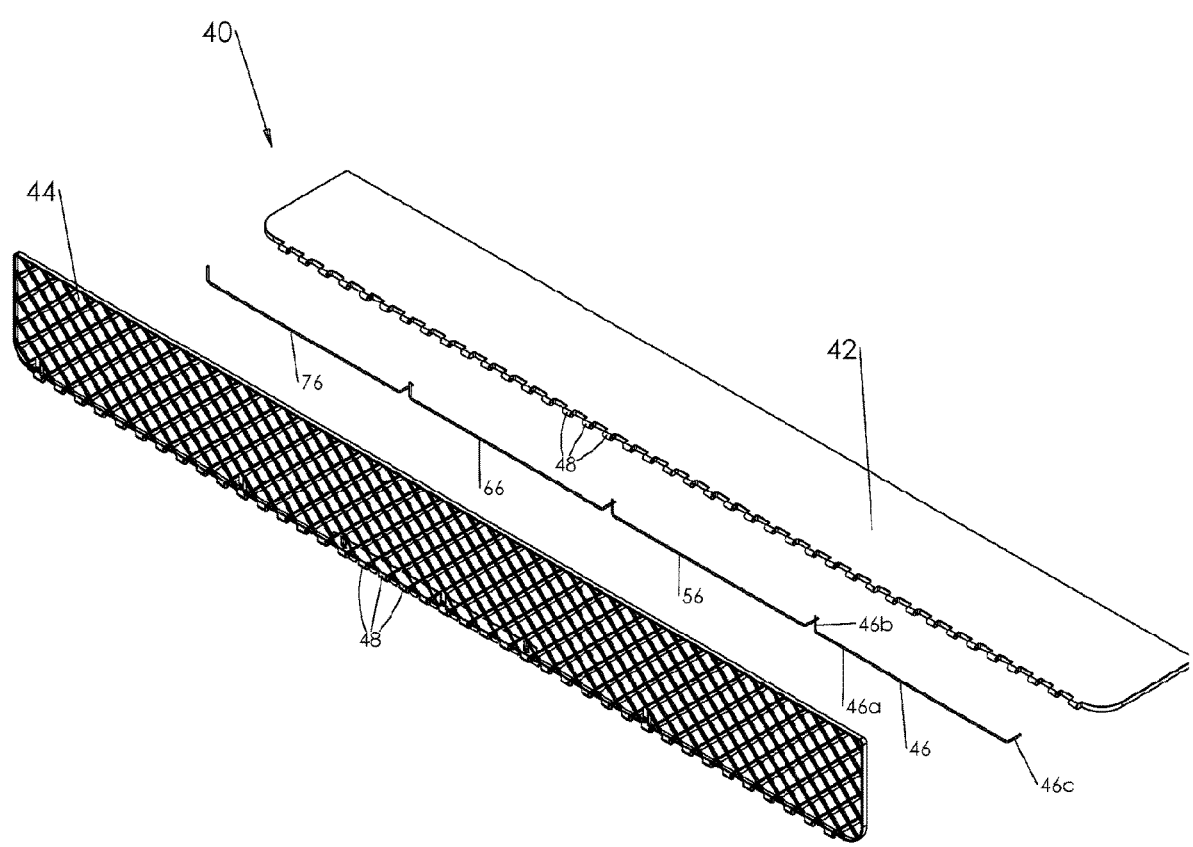
FIG. 2c illustrates an exploded view of an insert molded torsion bar hinge in accordance with one embodiment.

FIGS. 2a-2b illustrate insert molded torsion bar hinge 40 in accordance with one embodiment. FIG. 2c illustrates an exploded view of insert molded torsion bar hinge 40 in accordance with one embodiment. In one embodiment, insert molded torsion bar hinge 40 includes first hinged element 42, second hinged element 44, first torsion bar 46, and knuckles 48 (only a few of which are labeled for simplification of the figure). In one embodiment, insert molded torsion bar hinge 40 further includes second, third and fourth torsion bars 56, 66, and 76. In one embodiment, additional torsion bars 56, 66, and 76 are axially spaced on the same main torsion hinge axis X. In one embodiment, the additional torsion bars are configured to accommodate longer hinges and/or higher torque requirements for some applications. Furthermore, additional torsion bars provide improved torque consistency for insert molded torsion bar hinge 40.

As with hinge 10 above, a first end 46c of torsion bar 46 is completely embedded within first hinged element 42 and a second end 46b of torsion bar 46 is completely embedded within second hinged element 44, while alternating knuckles 48 from first and second hinged elements 42 and 44 extend about sections of the main bar body 46a of torsion bar 46. Second, third and fourth torsion bars 56, 66, and 76 are similarly embedded. As such, when first and second hinged elements 42 and 44 are rotated relative to each other, the first ends of the torsion bars 46-76 are rotated with first hinged element 42, while the second ends of the torsion bars 46-76 are held in place. This rotation of the ends of torsion bars 46-76 produces the torsional spring torque for insert molded torsion bar hinge 40.

Although four torsion bars are illustrated in FIGS. 2a-2c, more or less can be used. Furthermore, the length of each torsion bar, and the number of torsion bars in each, may be selected in order to control of the spring rate of the hinge 10. Because all of the torsion bars are molding together at once, however, this embodiment eliminates the freeplay and tolerance stack of bending and assembling that occurs in known hinges.

In one embodiment, first-fourth torsion bars 46, 56, 66 and 76 can be translated or mirrored to the additional locations as needed to provide leg forces in the locations desired on the moving first and second hinged elements 42 and 44 relative to each other. In one embodiment, insert molded torsion bar hinge 40 is formed by injection molding in a mold cavity similar to that described above with respect to FIG. 1*d*. Torsion bars 46-76 are placed into the mold prior to injecting material into the cavity, such that the mold material of first and second hinged elements 42 and 44 directly contacts and completely surrounds the ends of the torsion bars 46-76.

Figure 3A:
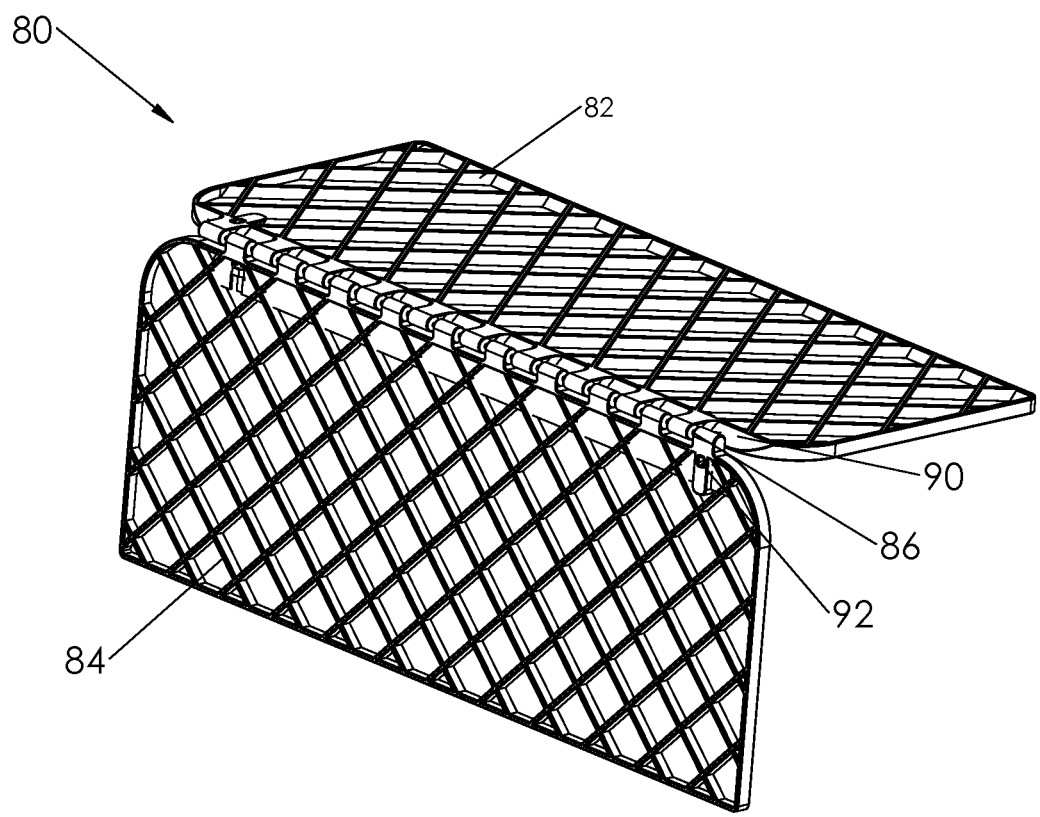
FIG. 3a illustrates an insert molded torsion bar hinge in accordance with one embodiment.
Figure 3B:
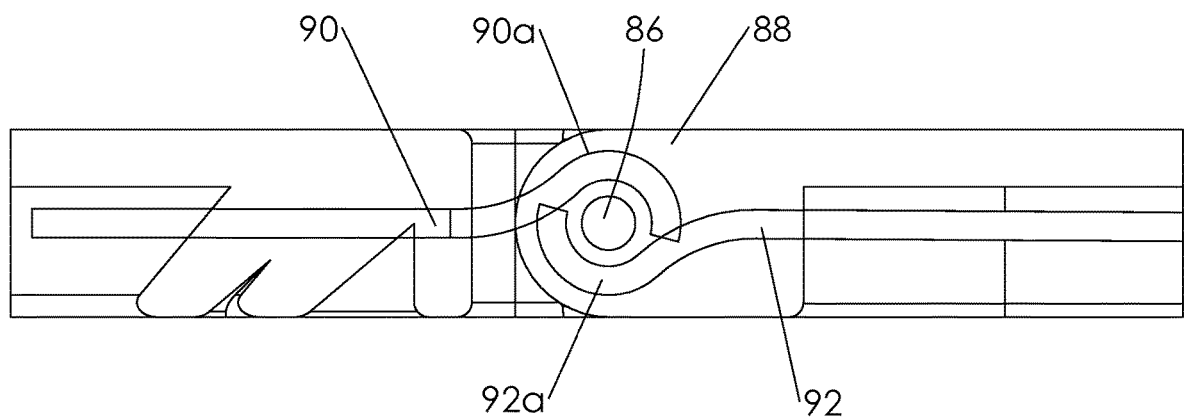
FIG. 3b illustrates a sectional view of an insert molded torsion bar hinge in accordance with one embodiment.
Figure 3C:
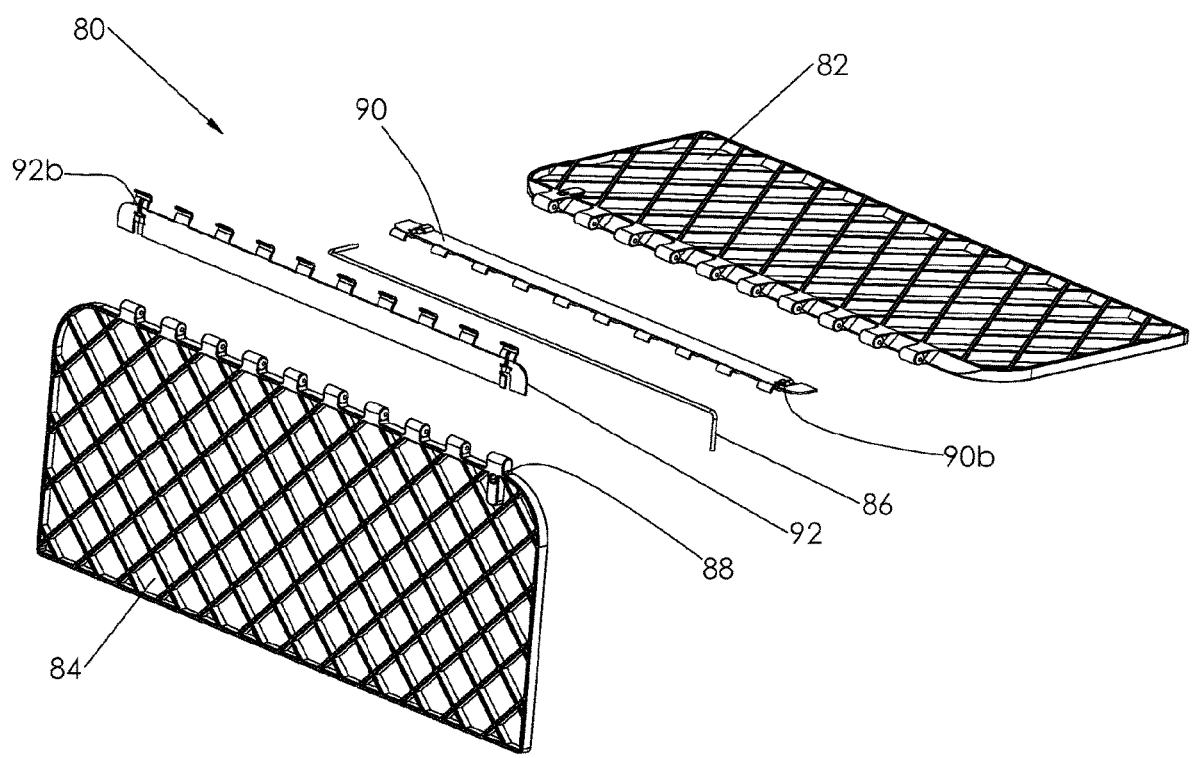
FIG. 3c illustrates an exploded view of an insert molded torsion bar hinge in accordance with one embodiment.

FIGS. 3*a*-3*b* illustrate insert molded torsion bar hinge 80 in accordance with one embodiment. FIG. 3*c* illustrates an exploded view of insert molded torsion bar hinge 80 in accordance with one embodiment. In one embodiment, insert molded torsion bar hinge 80 includes first hinged element 82, second hinged element 84, first torsion bar 86, and knuckles 88 (only a few of which are labeled for simplification of the figure).

In one embodiment, insert molded torsion bar hinge 80 further includes first and second toe support and impact bars 90 and 92. In one embodiment, first and second toe support and impact bars 90 and 92 distribute the force from the ends of torsion bar 86 further along the first and second hinged elements 82 and 84, and also provides some resistance to impact for misuse requirements that could damage knuckles 88 or hinge elements 82 and 84. In one embodiment, first and second toe support and impact bars 90 and 92 also include notches 90*a* and 92*a* configured to extend partially around torsion bar 86 in order to add more support.

As is visible in FIG. 3*b*, first and second toe support and impact bars 90 and 92 are spaced away from torsion bar 86 such that the molding material of first and second hinged elements 82 and 84 completely surrounds torsion bar 86. In one embodiment, insert molded torsion bar hinge 80 is formed by injection molding in a mold cavity similar to that described above with respect to FIG. 1*d*. Torsion bar 86 and first and second toe support and impact bars 90 and 92 are placed in to the mold prior to injecting material into the cavity. Within the cavity, first and second toe support and impact bars 90 and 92 are positioned away from torsion bar 86 such that the mold material forms directly around torsion bar 86 completely enclosing around its ends, without impact bars 90 and 92, or anything else, intervening between the mold material of first and second hinged elements 82 and 84 and torsion bar 86.

Figure 4A:
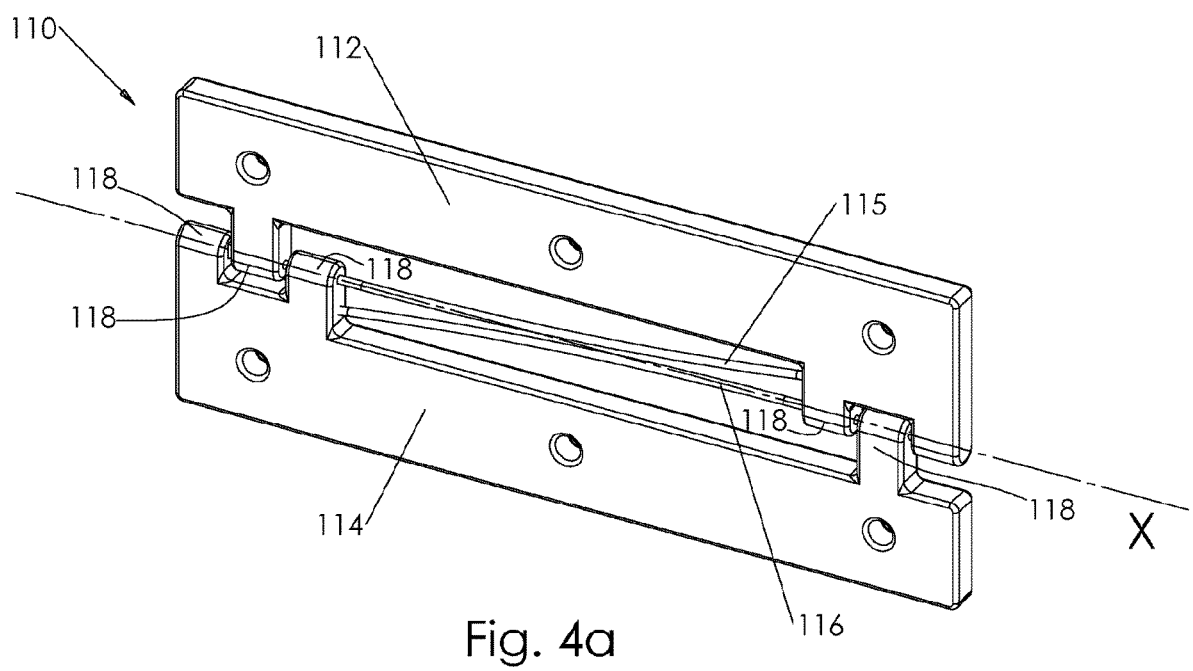
FIG. 4a illustrates an insert molded torsion bar hinge in accordance with one embodiment.
Figure 4B:
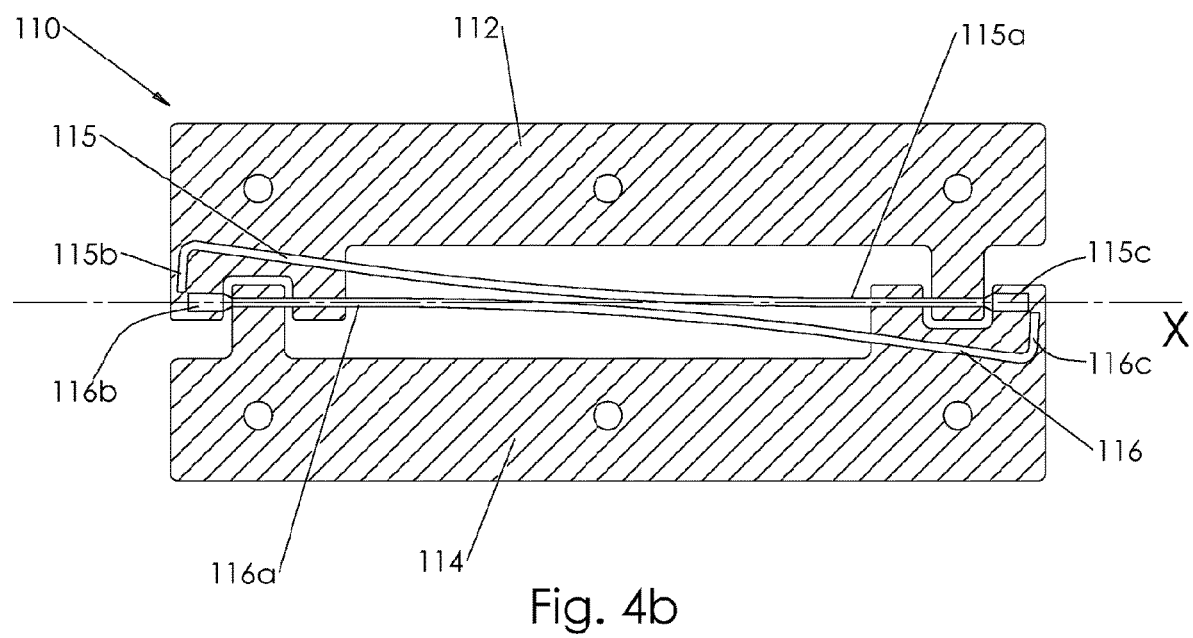
FIG. 4b illustrates a sectional view of an insert molded torsion bar hinge in accordance with one embodiment.
Figure 4C:
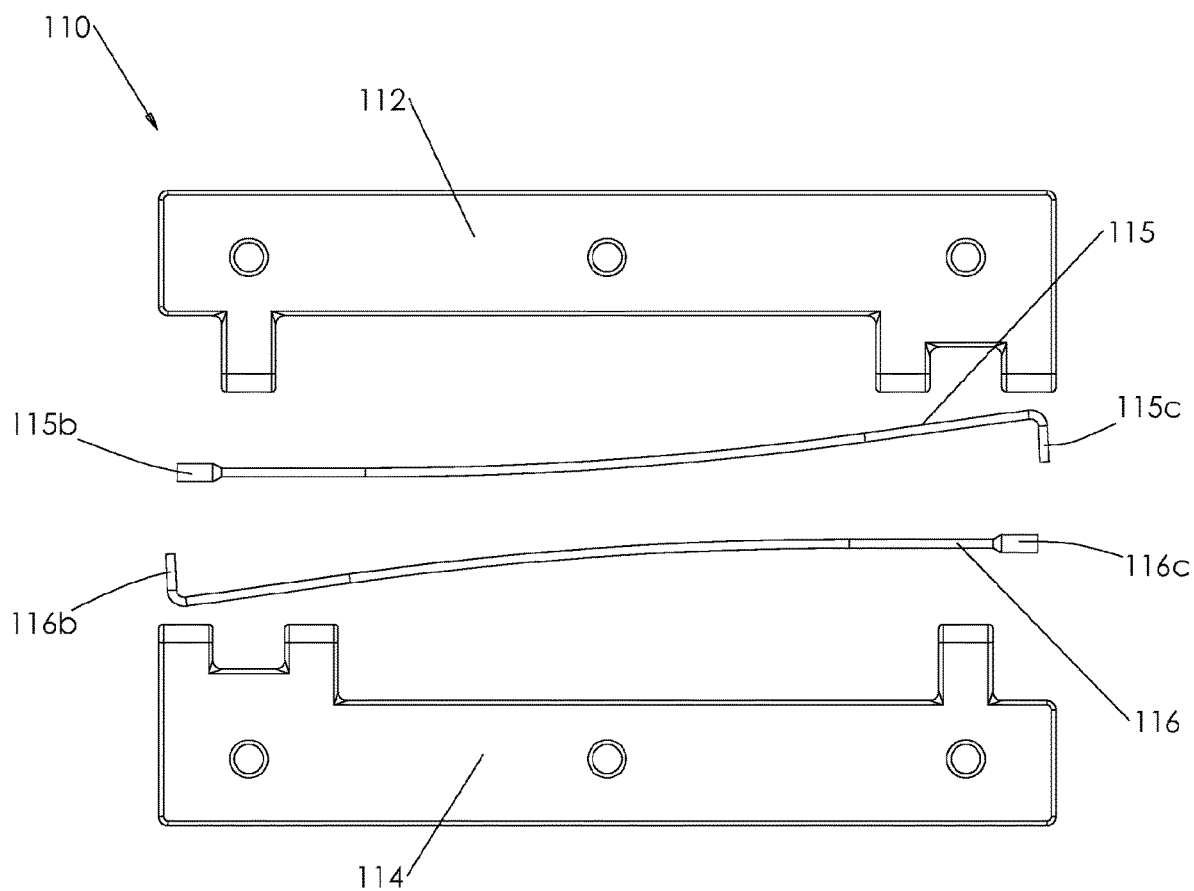
FIG. 4c illustrates an exploded view of an insert molded torsion bar hinge in accordance with one embodiment.

FIGS. 4*a*-4*b* illustrate insert molded torsion bar hinge 110 in accordance with one embodiment. FIG. 4*c* illustrates an exploded view of insert molded torsion bar hinge 110 in accordance with one embodiment. In one embodiment, insert molded torsion bar hinge 110 includes first hinged element 112, second hinged element 114, first torsion bar 115, second torsion bar 116, and knuckles 118. First torsion bar 115 includes main bar body 115*a*, first end 115*b*, and second end 115*c*. Second torsion bar 116 includes main bar body 116*a*, first end 116*b*, and second end 116*c*. In one embodiment, first and second hinged elements 112 and 114 are rotated relative to each other along main torsion hinge axis X, and first and second torsion bars 115 and 116 provide torsional spring torque for insert molded torsion bar hinge 110. In one embodiment, providing two torsion bars 115, 116 in parallel within a single insert molded torsion bar hinge 110 as shown can create two times the spring force than can be achieved in known designs of similar size configurations.

In one embodiment, first end 115*b* of first torsion bar 115 is completely embedded within first hinged element 112 and second end 115*c* of first torsion bar 115 is completely embedded within second hinged element 114, while alternating knuckles 118 from first and second hinged elements 112 and 114 extend about sections of main bar body 115*a* of first torsion bar 115. Similarly, first end 116*b* of second torsion bar 116 is completely embedded within first hinged element 112 and second end 116*c* of second torsion bar 116 is completely embedded within second hinged element 114, while alternating knuckles 118 from first and second hinged elements 112 and 114 extend about sections of main bar body 116*a* of second torsion bar 116. As such, when first and second hinged elements 112 and 114 are rotated relative to each other, first ends 115*b* and 116*b* of torsions bars 115 and 116 are rotated with first hinged element 112, while second ends 115*c* and 116*c* are rotated with second hinged element 114. This relative rotation of the ends of torsion bars 115 and 116 produces the torsional spring torque for insert molded torsion bar hinge 110.

In one embodiment, first and second torsion bars 115 and 116 are molded into insert molded torsion bar hinge 110 with injection molded plastic similar to that described above with respect to FIG. 1*d*. In one embodiment, insert molded torsion bar hinge 110 is molded over first and second torsion bars 115 and 116 in one shot. Each of first and second torsion bars 115 and 116 align with main torsion hinge axis X at one end (115*c* on one side and 116*b* on the other) and is connected off axis at the other end (115*b* and 116*c*). This configuration gives twice as much torque as previously described single bar designs for a given length.

In one embodiment, more complex hinge geometries and features may be desired. In such case, it may be preferred to mold first and second hinge elements 112 and 114 is in multiple steps or shots.

In one embodiment, first and second ends 115*b* and 116*b* and 115*c* and 116*c* of torsions bars 115 and 116 are contoured such that they are respectively fixed to first and second hinged elements 112 and 114. As with embodiments above, main bar body 115*a* of first torsion bar 115 is cylindrical and portions of main bar body 115*a* extend along main torsion hinge axis X, while first and second ends 115*b* and 115*c* of first torsion bar 115 are contoured to extend in non-parallel directions from main torsion hinge axis X. As such, when respectively embedded within first and second hinged elements 112 and 114, they will be fixed to and rotate with the first and second hinged elements 112 and 114.

While main bar body 116*a* of second torsion bar 116 is also cylindrical, first and second ends 116*b* and 116*c* of second torsion bar 116 are contoured such that they are non-cylindrical and at least partially flattened. As such, when respectively embedded within first and second hinged elements 112 and 114, first end 116*b* is fixed to, and cannot move relative to, first hinged element 112 and second end 116*c* is fixed to, and cannot move relative to, second hinged element 114. Other contours are possible to ensure respective torsion bar ends are secured within first and second hinged elements 112 and 114. For example, headed shapes for the ends, such as squares, hexes and splines can be used. When first and second hinged elements 112 and 114 are molded directly over these shapes, they will be fixed to the hinged elements.

Figure 5A:
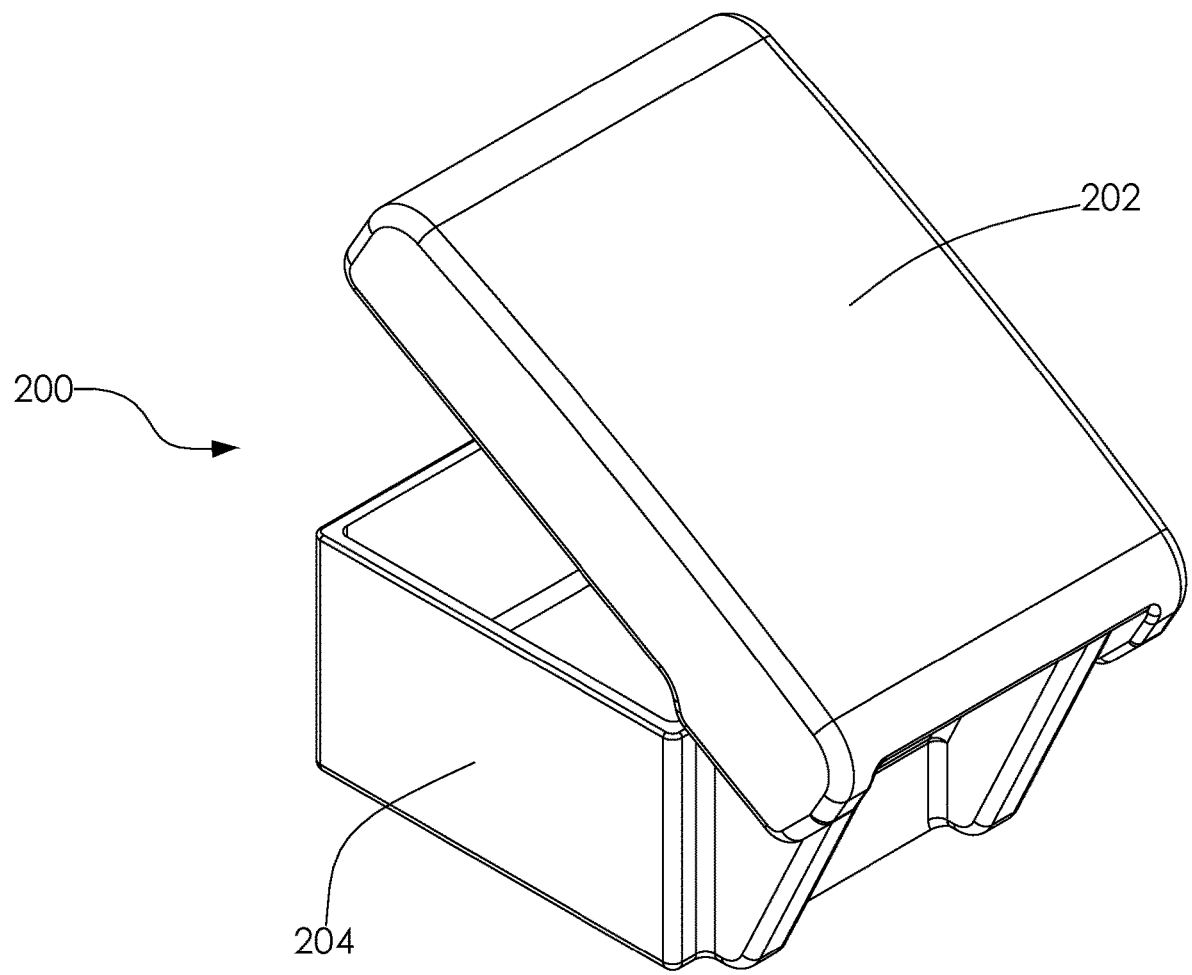
FIG. 5a illustrates a hinged device in accordance with one embodiment.

Insert molded torsion bar hinges 10, 40, 80 and 110 have a variety of useful applications where it is desired to have a torsional spring torque between two or more hinged elements. FIG. 5a illustrates one such exemplary application in hinged device 200 in accordance with one embodiment. In one embodiment, hinged device 200 includes hinged cover 202, container housing 204 and insert molded torsion bar hinge 240. In one embodiment, hinged device 200 is a center console in an automobile. In one embodiment, insert molded torsion bar hinge 240 provides consistent and predictable torsional spring torque for opening and closing hinged cover 202 on container housing 204. In one embodiment, insert molded torsion bar hinge 240 allows the console hinged cover 202 to pop up upon release of a latch or other control device (not shown).

Figure 5B:
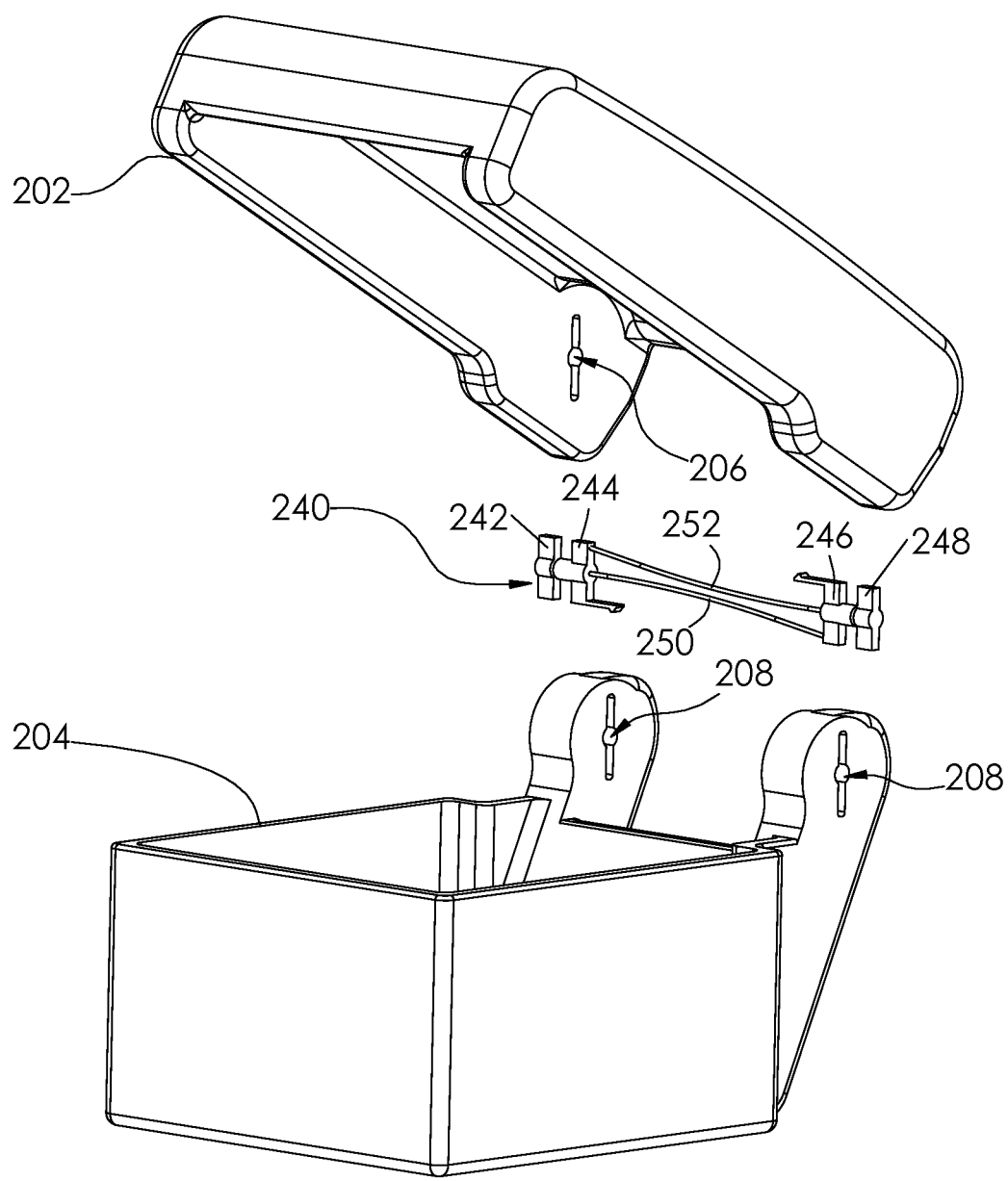
FIG. 5b illustrates an exploded view of a hinged device in accordance with one embodiment.
Figure 5C:
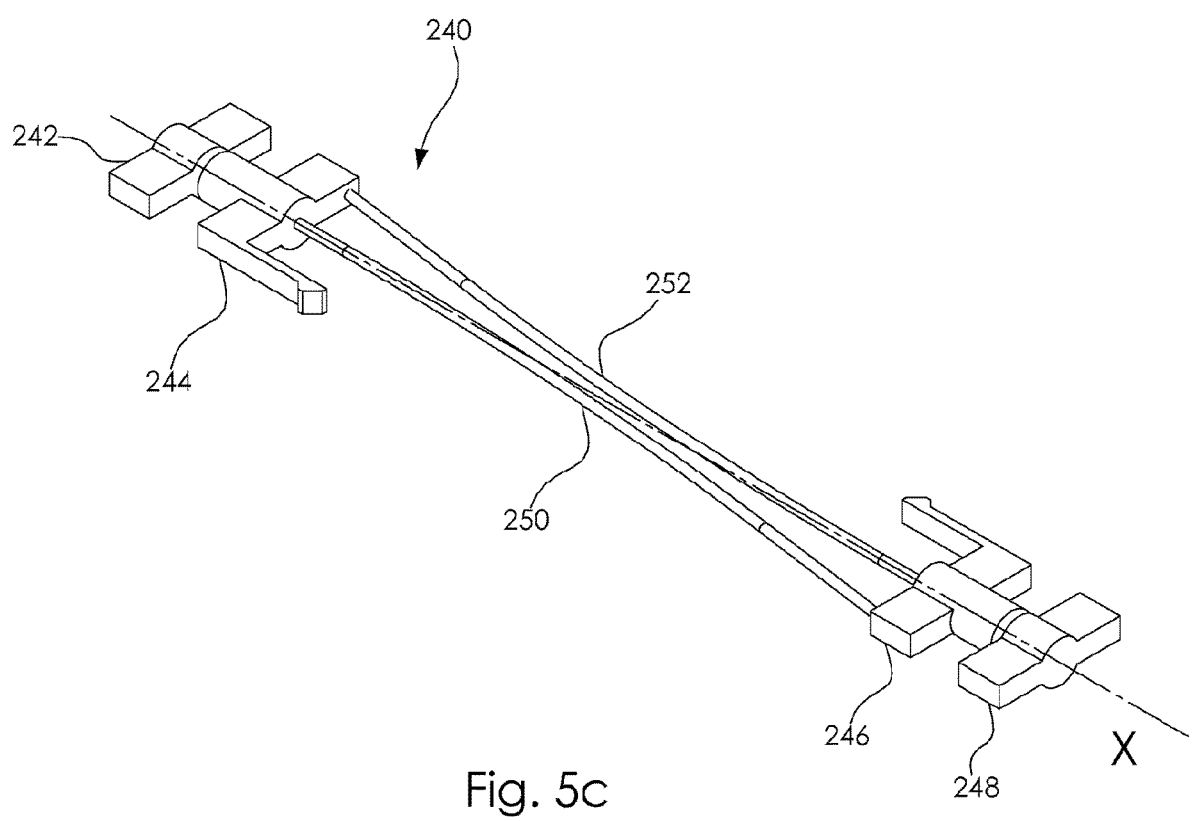
FIG. 5c illustrates a detailed view of an insert molded hinge in accordance with one embodiment.
Figure 5D:
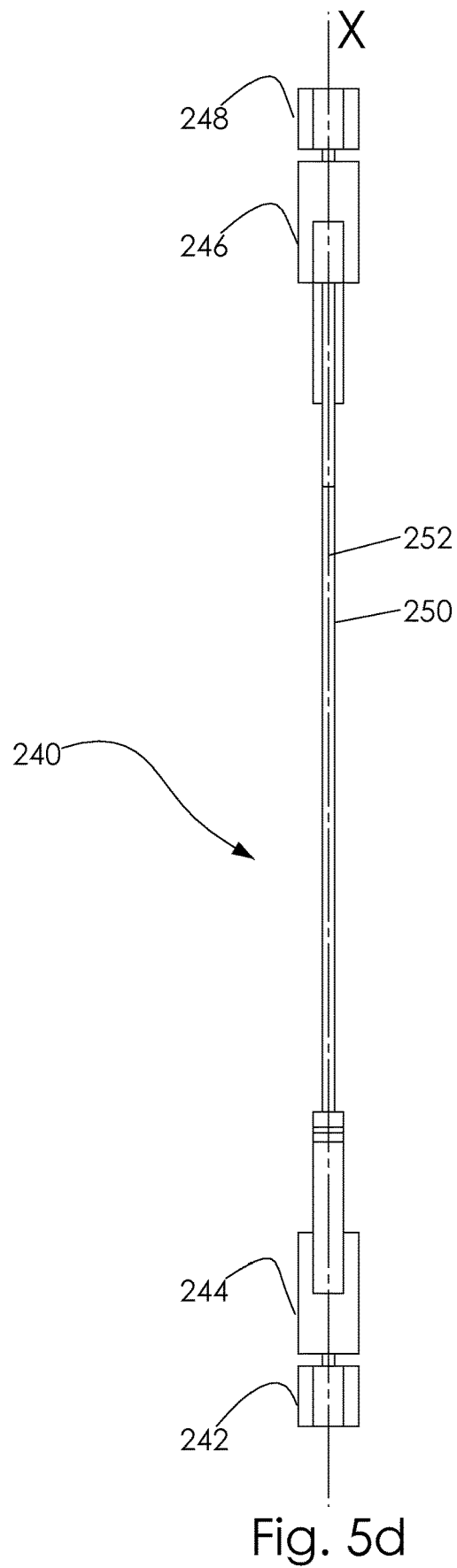
FIG. 5d illustrates a side view of an insert molded hinge in accordance with one embodiment.
Figure 5E:
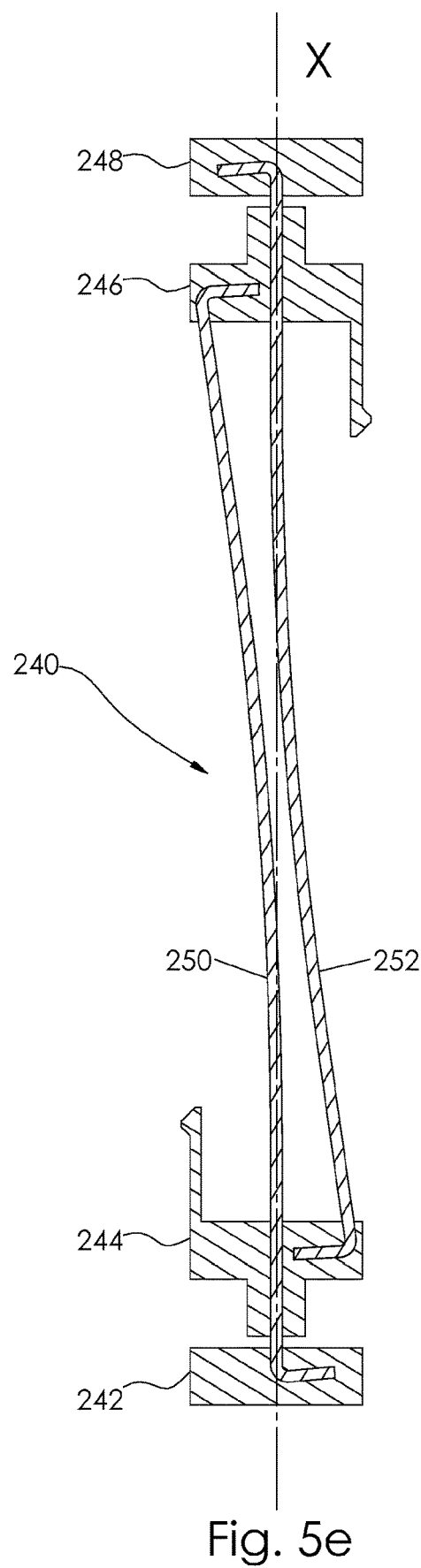
FIG. 5e illustrates a sectional view of an insert molded hinge in accordance with one embodiment.

FIG. 5b illustrates an exploded view of hinged device 200 and FIGS. 5c-5e are detailed, side and sectional views of insert molded torsion bar hinge 240. In one embodiment, hinged cover 202 includes first and second slots 206 (only one is visible in FIG. 5b and the other is identical on the opposite side) and container housing 204 similarly includes first and second slots 208 on either side of the container housing 204. Slots 206 and 208 are positioned to align insert molded torsion bar hinge 240 at the desired neutral angle which along with the spring rate provides the hinge preload when fully closed. Insert molded torsion bar hinge 240 includes first, second, third and fourth hinged elements 242, 244, 246 and 248 and further includes first and second torsion bars 250 and 252.

In one embodiment, a first end of first torsion bar 250 is embedded within first hinged element 242 and a second end of first torsion bar 250 is embedded within third hinged element 246. A first end of second torsion bar 252 is embedded within second hinged element 244 and a second end of second torsion bar 252 is embedded within fourth hinged element 248. Insert molded torsion bar hinge 240 can be manufactured with a one-shot molding process as described above with the other embodiments. Just like the prior embodiments, the molding material of the hinged elements completely surround and directly encapsulate the torsion bar ends, which each includes a contoured features, such that there is no relative movement between the torsion bar ends and the hinged elements.

In operation, insert molded torsion bar hinge 240 is coupled into hinged device 200 in that first hinged element 242 is placed into first slot 206 of hinged cover 202 and fourth hinged element 248 is placed into second slot 206 of hinged cover 202, while second hinged element 244 is placed into first slot 208 of container housing 204 and third hinged element 246 is placed into second slot 208 of container housing 204. First and second torsion bars 250 and 252 provide torsional spring torque for opening and closing hinged cover 202 on container housing 204.

Figure 6A:
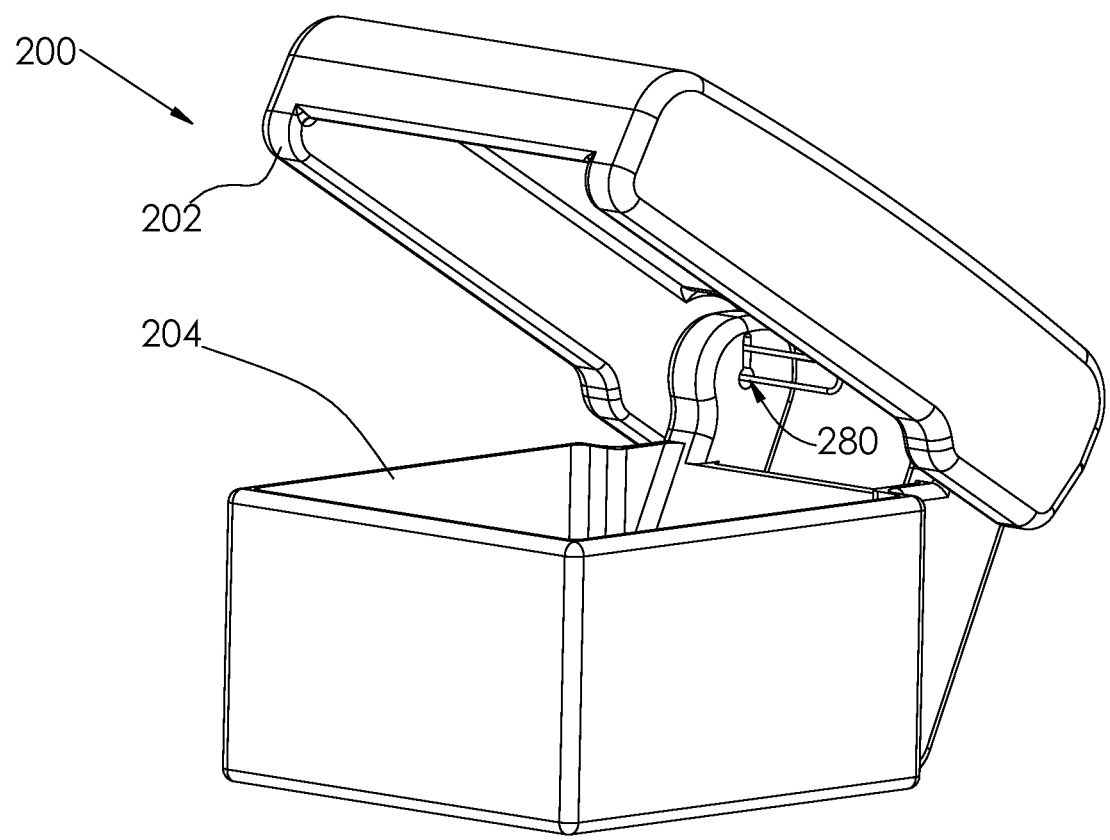
FIG. 6a illustrates a hinged device in accordance with one embodiment.
Figure 6B:
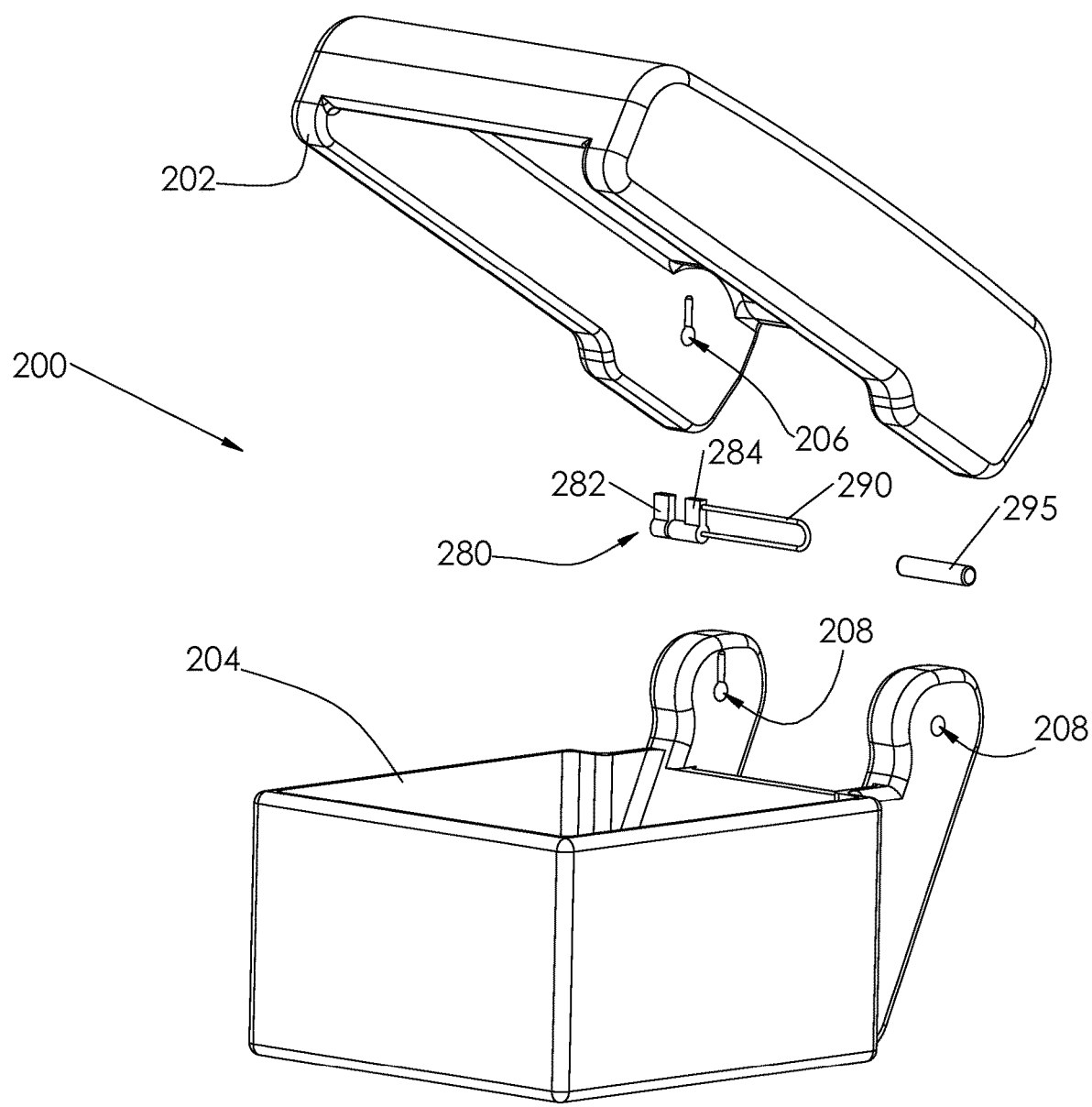
FIG. 6b illustrates an exploded view of a hinged device in accordance with one embodiment.

FIG. 6a-6b illustrate another exemplary application in hinged device 200 in accordance with one embodiment. In one embodiment, hinged device 200 includes hinged cover 202, container housing 204 and insert molded torsion bar hinge 280. In one embodiment, hinged device 200 is a center console in an automobile. In one embodiment, insert molded torsion bar hinge 280 provides consistent and predictable torsional spring torque for opening and closing hinged cover 202 on container housing 204.

Figure 6C:
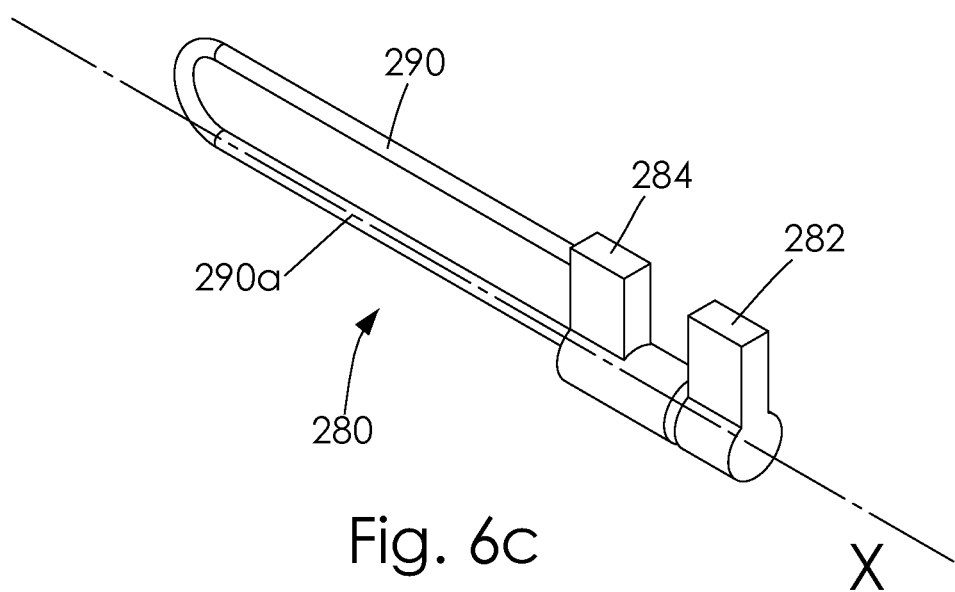
FIG. 6c illustrates an insert molded torsion bar hinge in accordance with one embodiment.
Figure 6D:
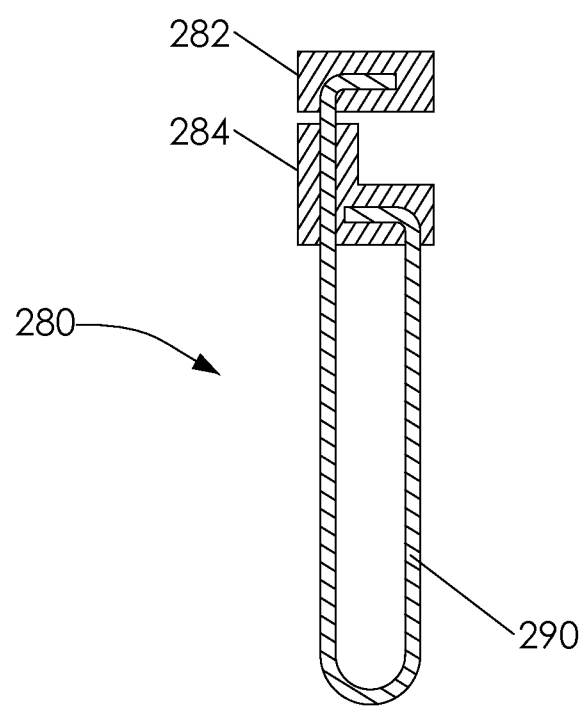
FIG. 6d illustrates a sectional view of an insert molded torsion bar hinge in accordance with one embodiment.

FIGS. 6c-6d illustrate insert molded torsion bar hinge 280 in accordance with one embodiment. In one embodiment, insert molded torsion bar hinge 280 provides an alternative for hinging hinged cover 202 and container housing 204. In one embodiment, insert molded torsion bar hinge 280 includes first and second hinged elements 282 and 284, and further includes torsion bar 290. For example, in one embodiment, first hinged element 282 is placed into first slot 206 of hinged cover 202, while second hinged element 284 is placed into first slot 208 of container housing 204. Insert molded torsion bar hinge 280 provides torsional spring torque for opening and closing hinged cover 202 on container housing 204. In one embodiment, an insert molded torsion bar hinge 280 can be placed into both sides of hinged device 200. In another embodiment, insert molded torsion bar hinge 280 can be placed into one side of the hinged device 200, while a plain pivot or friction hinge 295 can be placed on the other side as desired.

In one embodiment, a first end of first torsion bar 290 is embedded within first hinged element 282 and a second end of torsion bar 290 is embedded within second hinged element 284. Insert molded torsion bar hinge 280 can be manufactured with a one-shot molding process as described above with the other embodiments. Just like the prior embodiments, the molding material of the hinged elements completely surround and directly encapsulate the ends of each of the torsion bar ends, which each include contoured features, such that there is no relative movement between the torsion bar ends and the hinged elements. Also, as with prior embodiments, a circular cross section torsion bar is used as the pivot axis. When the first and second hinged elements 282, 284 are rotated relative to each other, torsion bar 290 pivots along the main torsion hinge axis providing torsional spring torque.

Figure 7A:
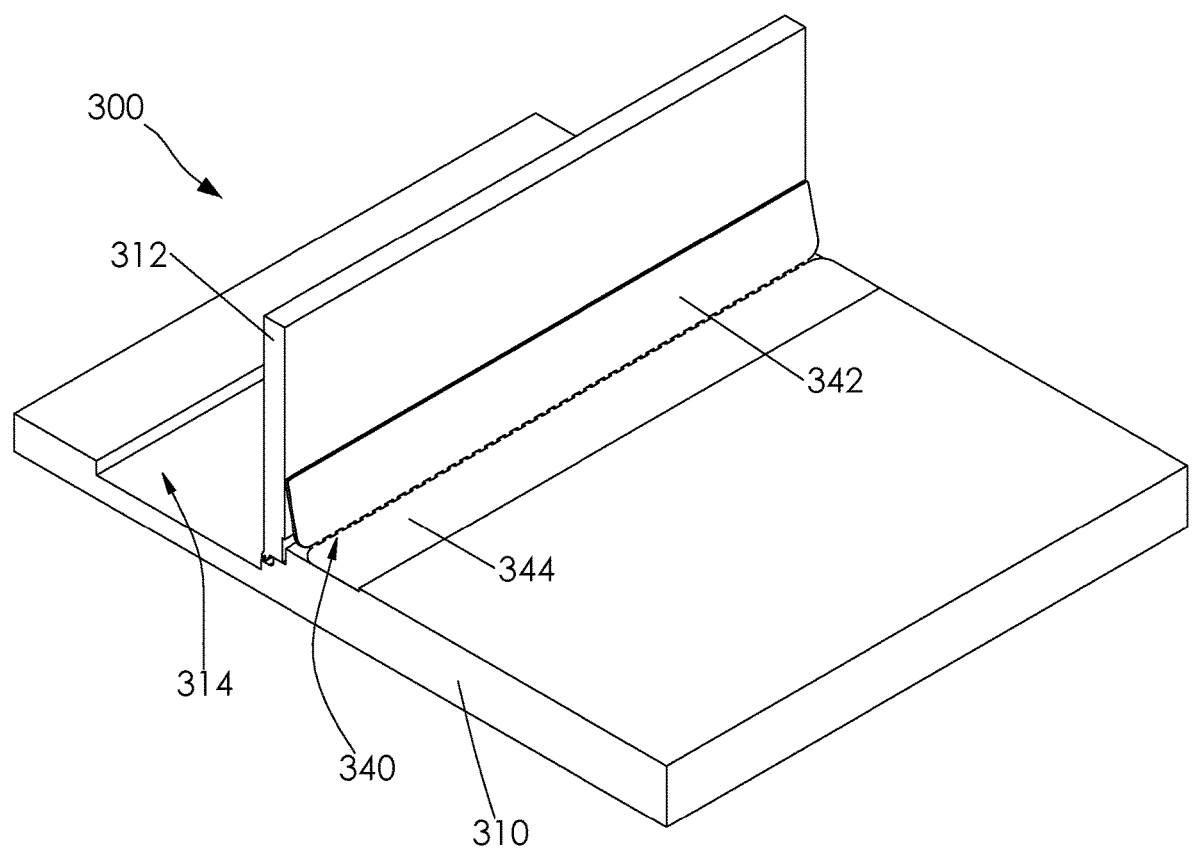
FIGS. 7a-7c illustrate a fold down system in accordance with one embodiment.
Figure 7B:
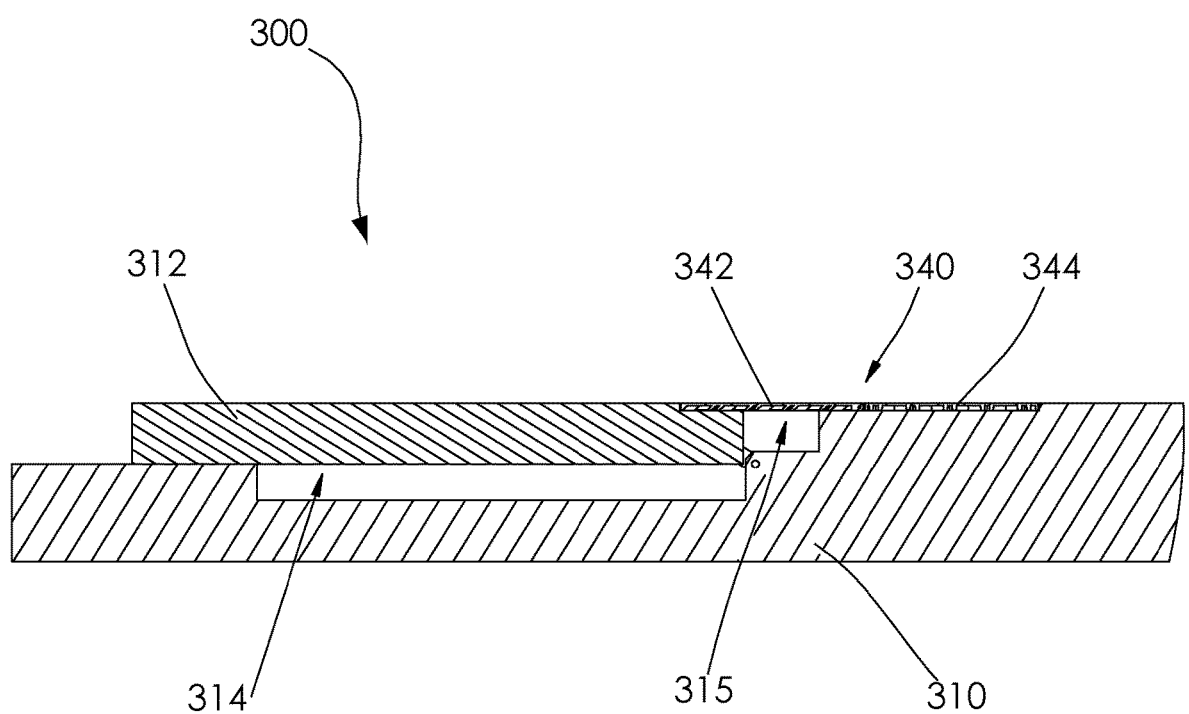
Figure 7C:
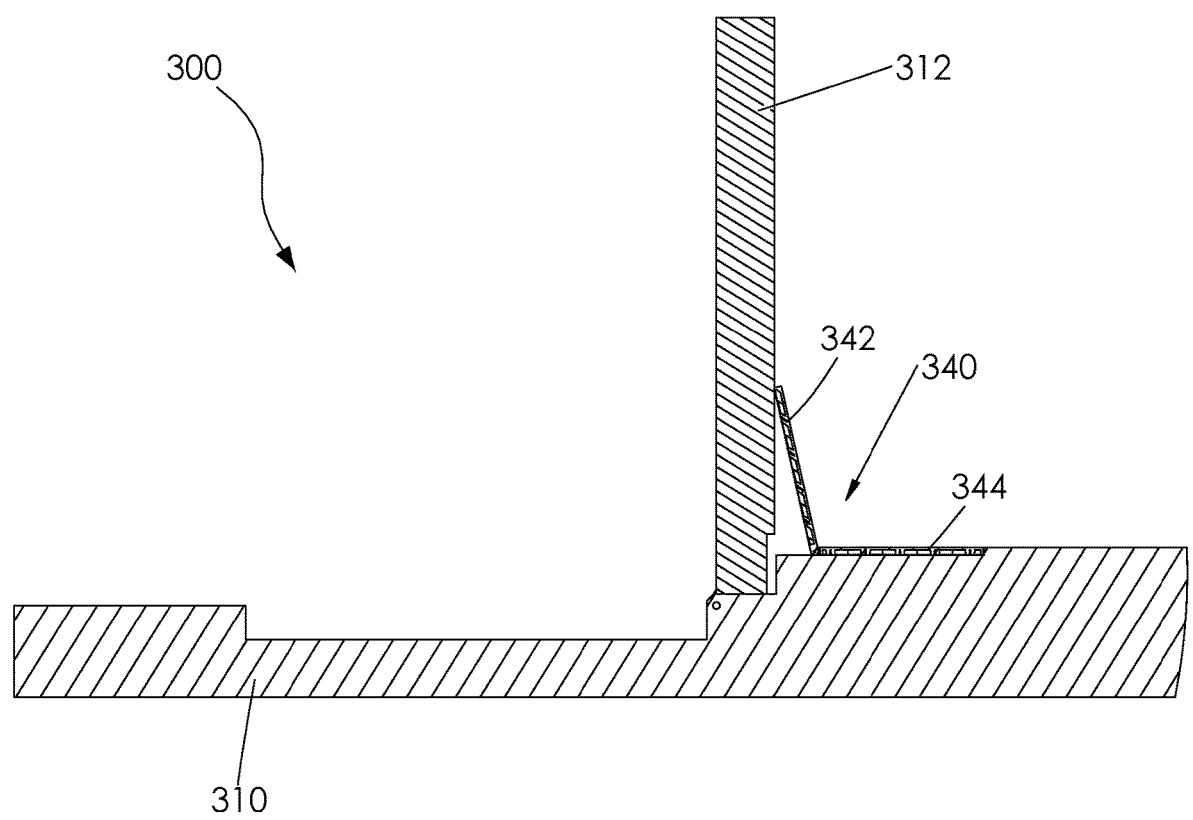

FIGS. 7a-7c illustrate fold down system 300 in accordance with one embodiment. In one embodiment, fold down system 300 includes base 310, folding member 312, and insert molded torsion bar hinge 340. In one embodiment, insert molded torsion bar hinge 340 includes fixed hinge side 344 and spring loaded side 342. In operation, folding member 312 has an open position (illustrated in FIGS. 7a and 7c) and a folded position (illustrated in FIG. 7b). When folding member 312 is folded down against base 310, it leaves a gap 315. In one embodiment, insert molded torsion bar hinge 340 is positioned to automatically cover gap 315 when folding member 312 is folded down against base 310, due to its torsional spring torque, allowing for a smooth flat surface when folding member 312 is folded down.

Such a gap hider can be useful in a variety of applications, such as in a pick-up truck, where folding member 312 could be a tailgate on a truck, a mid-gate on a truck with the option to extend the bed into the cab, a common back row seat that folds down, or any of a variety of other dividing panels.

In one embodiment, insert molded torsion bar hinge 340 is injection molded in a single shot mold over one or more torsion bars, as described above with respect to insert molded torsion bar hinges 10, 40 and 80. It can have one or more torsion bars, which include ends that are contoured and embedded on one end within the fixed hinge side 344 and on the other end within the spring loaded side 342. By attaching the fixed hinge side 344 against base 310 and then loading the embedded torsion bars to press spring loaded side 342 against folding member 312, torsion bar hinge 340 will fold down over gap 315 as folding member 312 is folded down to base 310.

Fixed hinge side 344 can have any number of attachment options to secure it to base 310, such as screw clearance holes, glue down, snap fits, studs, etc. The spring loaded side 342 can include a variety of cosmetic contours and shapes, along with rib thickness for structural support.

Insert molded torsion bar hinge 340 has a smaller barrel size than traditional hinges, and it eliminates separate coil springs often used in traditional hinges. This has superior visual appearance and also eliminates potential entanglement associated with coil springs. Insert molded torsion bar hinge 340 is made in a single shot injection mold as described above, it can also readily include various plastic colors or textures and will avoid extra parts or processing currently required to make a finished product known in the art.

Figure 8A:
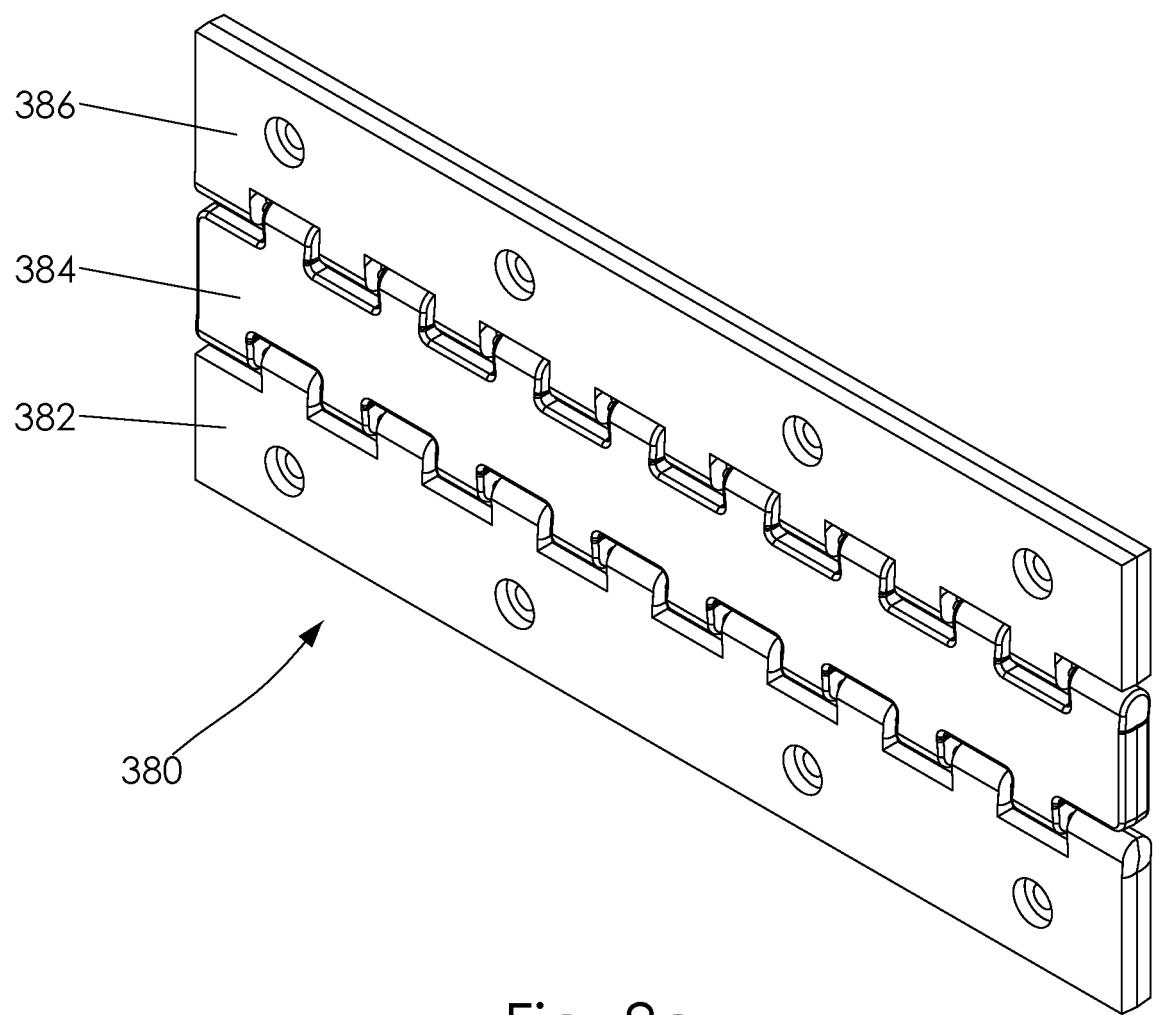
FIGS. 8a-8b illustrate a multi-axis insert molded torsion bar hinge in accordance with one embodiment.
Figure 8B:
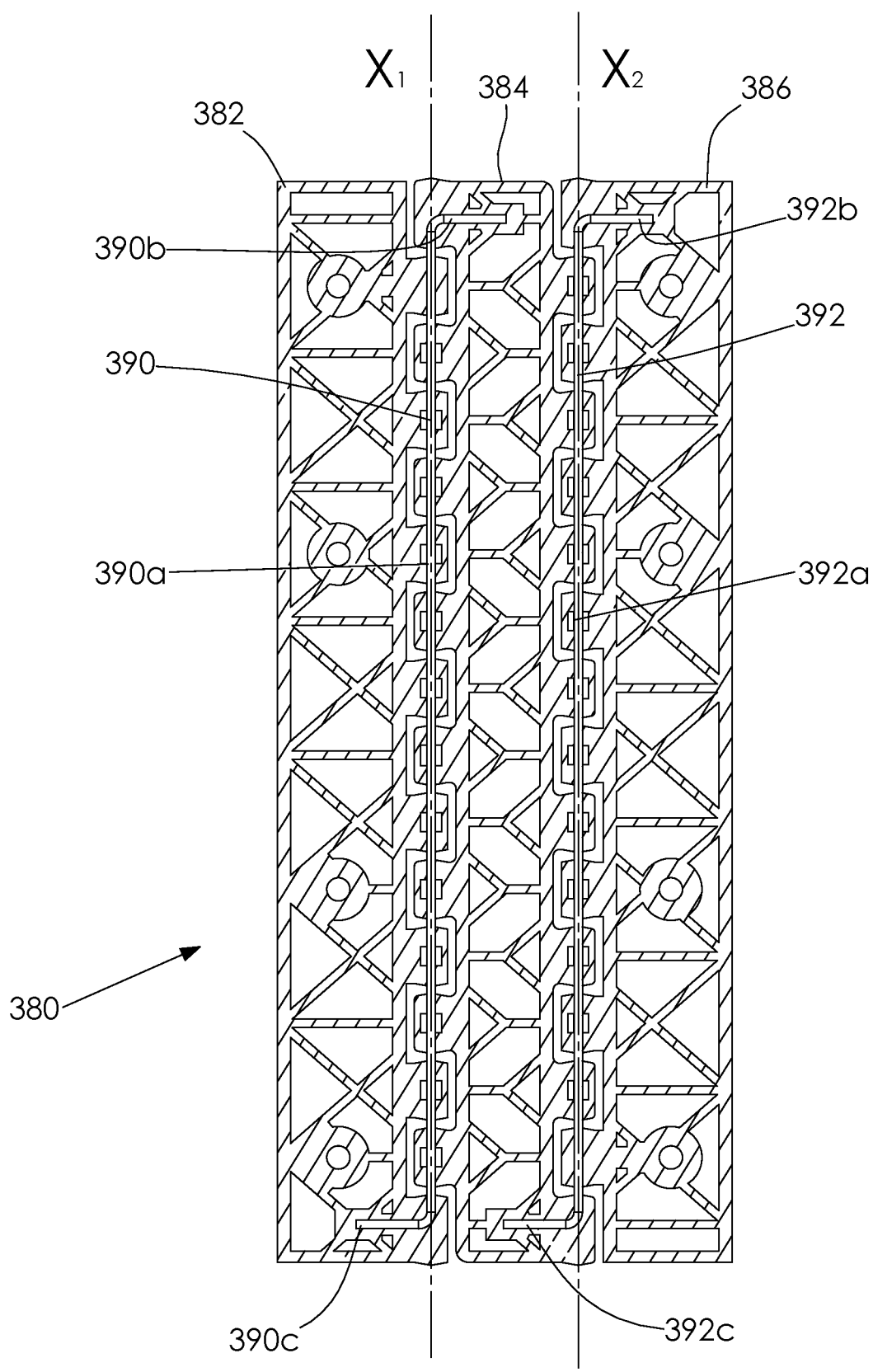
Figure 8C:
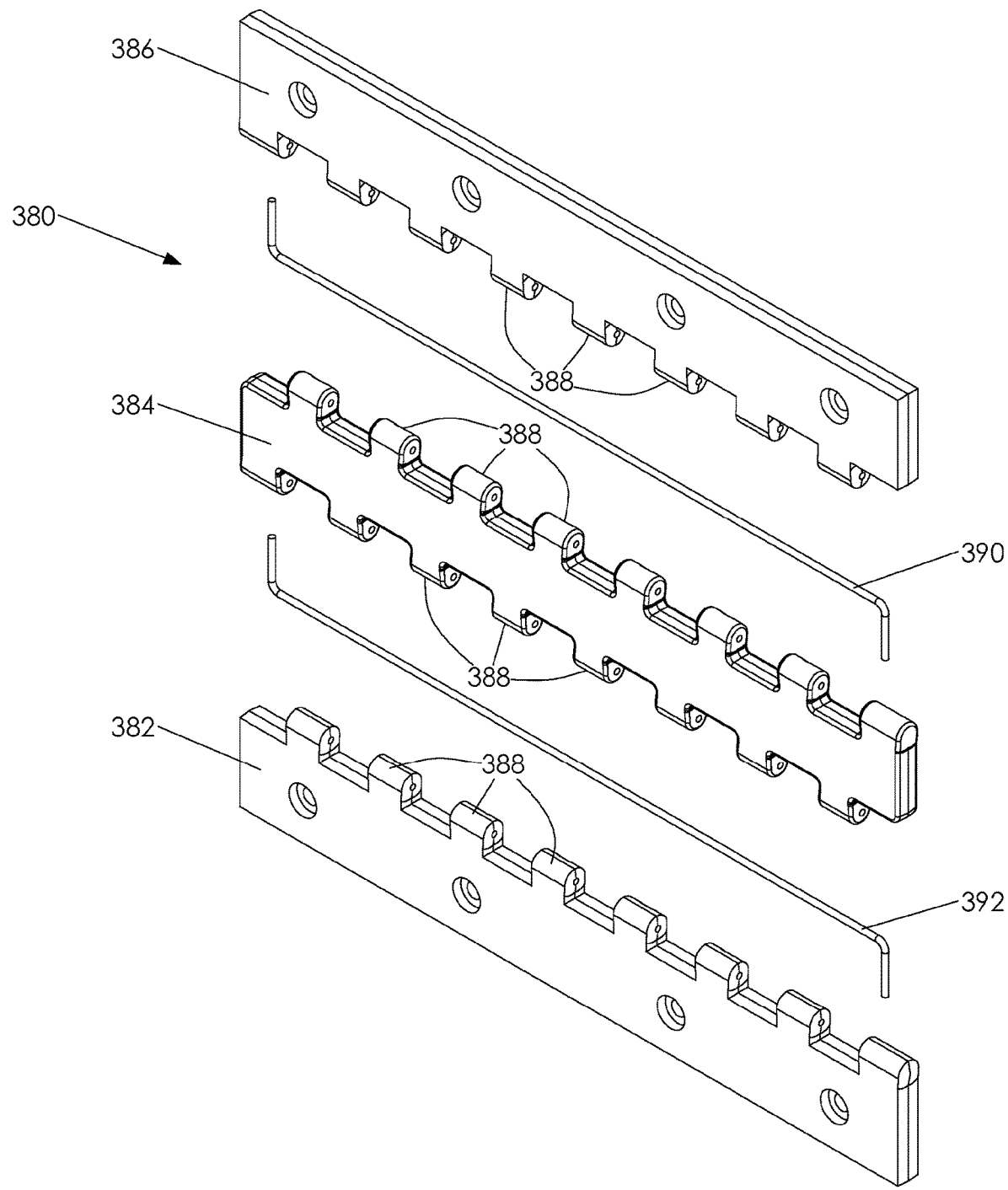
FIG. 8c illustrates an exploded view of a multi-axis insert molded torsion bar hinge in accordance with one embodiment.

FIGS. 8a-8b illustrate multi-axis insert molded torsion bar hinge 380 in accordance with one embodiment. FIG. 8c illustrates an exploded view of multi-axis insert molded torsion bar hinge 380 in accordance with one embodiment. In one embodiment, multi-axis insert molded torsion bar hinge 380 includes first, second and third hinged elements 382, 384 and 386 and first and second torsion bars 390 and 392. Multi-axis insert molded torsion bar hinge 380 is similar to the above-described torsion hinges, but has two axes of rotation ($X_1$ and $X_2$), rather than one.

In one embodiment, each of first and second torsion bars 390 and 392 include a main bar body 390a, 392a, first end 390b, 392b and a second end 390c, 392c. Main bar body 390a of first torsion bar 390 lies in a first axis $X_1$, and main bar body 392a of second torsion bar 392 lies in a second axis $X_2$. In one embodiment, first and second ends 390b, 392b and 390c, 392c are contoured to extend in non-parallel direction to the axes X1 and X2. In other embodiments, other contours, such as flattened sections, can be used.

In one embodiment, first end of first torsion bar 390b is embedded within second hinged element 384, second end of first torsion bar 390c is embedded within first hinged element 382, first end of second torsion bar 392b is embedded within third hinged element 386, and second end of second torsion bar 392c is embedded within second hinged element 384. Insert molded torsion bar hinge 380 can be manufactured with a one-shot molding process as described above with the other embodiments. Just like the prior embodiments, the molding material of the hinged elements completely surround and directly encapsulate the ends of each of the torsion bar ends, which each includes the contoured features, such that there is no relative movement between the torsion bar ends and the hinged elements.

Furthermore, knuckles 388 (only a few are labeled for simplicity) are formed in each of first, second and third hinged elements 382, 384 and 386 such that knuckles 388 from first and second hinged elements 382 and 384 are formed directly over the main bar body 390a of first torsion bar 390 and such that knuckles 388 from second and third hinged elements 384 and 386 are formed directly over the main bar body 392a of second torsion bar 392. Since main bar body 390a, 392a of torsion bars 390, 392 are cylindrical, torsion bar 390 rotates within knuckles 388 as first and second hinged elements 382 and 384 rotate relative to each other along first axis $X_1$, and torsion bar 392 rotates within knuckles 388 as second and third hinged elements 384 and 386 rotate relative to each other along second axis $X_2$. Additional hinged elements and torsion bars can be added to have additional hinged parts as needed.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. An insert molded torsion bar hinge comprising:
a cylindrical metal torsion bar comprising a main bar body, a portion of which extends along a torsion bar axis, a first contoured bar end and a second contoured bar end on opposite ends of the main bar body;
a first hinged element of molded plastic and comprising a first knuckle, the first hinged element molded directly over and encompassing the first contoured bar end such that the first contoured bar end is fixed within and not rotatable relative to the first hinged element, and the first knuckle molded directly over and encompassing a portion of the main bar body; and
a second hinged element of molded plastic and comprising a second knuckle, the second hinged element molded directly over and encompassing the second contoured bar end such that the second contoured bar end is fixed within and not rotatable relative to the second hinged element, and the second knuckle molded directly over and encompassing a portion of the main bar body;
wherein the first and second hinged elements are configured to rotate relative to each other along the torsion bar axis, the torsion bar producing a torsional spring torque with the relative rotation of the first and second hinged elements.

2. The insert molded torsion bar hinge of claim 1, wherein there is no coil between the molded plastic of the first hinged element and the first bar end and there is no coil between the molded plastic of the second hinged element and the second bar end.

3. The insert molded torsion bar hinge of claim 1 configured as a piano hinge, wherein the first hinged element further comprises a third knuckle configured over the main bar body and the second hinged element further comprises a fourth knuckle configured over the main bar body.

4. The insert molded torsion bar hinge of claim 3, wherein the first and third knuckles of the first hinged element alternate along the main bar body with the second and fourth knuckles of the second hinged element.

5. The insert molded torsion bar hinge of claim 1, wherein the cylindrical metal torsion bar is in contact exclusively with the first and second hinged elements.

6. The insert molded torsion bar hinge of claim 1, wherein the first bar end and the second bar end are contoured to extend in directions non-parallel to the torsion bar axis or into a non-cylindrical shape such that when contained within the first and second hinged elements, the contoured bar ends are fixed within and not rotatable relative to the hinged elements.

7. The insert molded torsion bar hinge of claim 1, wherein friction torque between the knuckles and the torsion bar is decreased by providing notch outs in the knuckles.

8. The insert molded torsion bar hinge of claim 1 further comprising an impact bar embedded within at least the first or second hinged element.

9. The insert molded torsion bar hinge of claim 1 further comprising an additional cylindrical metal torsion bar comprising a main bar body, a portion of which extends along a torsion bar axis, a first contoured bar end and a second contoured bar end on opposite ends of the main bar body;
wherein the first hinged element of molded plastic is molded directly over and encompassing the first contoured bar end of the additional torsion bar such that the first contoured bar end is fixed within and not rotatable relative to the first hinged element; and
wherein the second hinged element of molded plastic is molded directly over and encompassing the second contoured bar end of the additional torsion bar such that the second contoured bar end is fixed within and not rotatable relative to the second hinged element.

10. The insert molded torsion bar hinge of claim 9, wherein further comprising at least three cylindrical metal torsion bars each comprising a main bar body, a portion of which extends along a torsion bar axis, a first contoured bar end and a second contoured bar end on opposite ends of the main bar body;
  wherein the first hinged element of molded plastic is molded directly over and encompassing the first contoured bar end of the at least three cylindrical torsion bars such that the first contoured bar end is fixed within and not rotatable relative to the first hinged element; and
  wherein the second hinged element of molded plastic is molded directly over and encompassing the second contoured bar end of the at least three cylindrical torsion bars such that the second contoured bar end is fixed within and not rotatable relative to the second hinged element.

11. The insert molded torsion bar hinge of claim 1 further comprising
  further comprising an additional cylindrical metal torsion bar comprising a main bar body, a portion of which extends along a second torsion bar axis, a first contoured bar end and a second contoured bar end on opposite ends of the main bar body;
  wherein the second hinged element of molded plastic is molded directly over and encompassing the second contoured bar end of the additional torsion bar such that the second contoured bar end is fixed within and not rotatable relative to the second hinged element
  a third hinged element of molded plastic and comprising a first knuckle, the third hinged element molded directly over and encompassing the first contoured bar end of the additional cylindrical metal torsion bar such that the first contoured bar end is fixed within and not rotatable relative to the third hinged element, and the first knuckle molded directly over and encompassing a portion of the main bar body of the additional cylindrical metal torsion bar.

12. A method of forming an insert molded torsion bar hinge comprising:
  placing a cylindrical metal torsion bar into a mold cavity, the torsion bar comprising a main bar body, portion of which extends along a torsion bar axis, a first contoured bar end and a second contoured bar end on opposite ends of the main bar body, and the mold cavity comprising first and second mold cavity parts;
  wherein the first contoured bar end is contained exclusively within the first mold cavity part, the second contoured bar end is contained exclusively within the second mold cavity part, and wherein portions of the main bar body are contained within both the first and second mold cavity parts;
  injection molding a flowable plastic into the first mold cavity part and directly over and fully encompassing the first contoured bar end and directly over and fully encompassing at least a portion of the main bar body;
  allowing the flowable plastic in the first mold cavity part to freeze, thereby forming a first hinged element of molded plastic containing the first contoured bar end and comprising a first knuckle containing at least a portion of the main bar body;
  injection molding a flowable plastic into the second mold cavity part and directly over and fully encompassing the second contoured bar end and directly over and fully encompassing at least a portion of the main bar body; and
  allowing the flowable plastic in the second mold cavity part to freeze, thereby forming a second hinged element of molded plastic containing the second contoured bar end and comprising a second knuckle containing at least a portion of the main bar body;
  wherein the first and second hinged elements are configured to rotate relative to each other along the torsion bar axis.

13. The method of forming an insert molded torsion bar hinge according to claim 12 further comprising injecting the flowable plastic into the first and second mold cavity parts in a single shot.

14. The method of forming an insert molded torsion bar hinge according to claim 12 further comprising injecting the flowable plastic into the first and second mold cavity parts in separate shots.

15. The method of forming an insert molded torsion bar hinge according to claim 12 further comprising forming a plurality of knuckles in both the first and second hinge elements that alternate along the main bar body.

16. The method of forming an insert molded torsion bar hinge according to claim 12, wherein the torsion bar is configured to produce a torsional spring torque with the relative rotation of the first and second hinged elements.

17. A fold down system comprising:
  a base;
  a folding member hinged to the base such that it is foldable relative to the base; and
  an insert molded torsion bar hinge comprising a fixed hinge side and a spring loaded side, the fixed hinge side fixed to the base and the spring loaded side rotatable with the folding member;
  wherein the insert molded torsion bar hinge comprises:
    a cylindrical metal torsion bar comprising a main bar body, a portion of which extends along a torsion bar axis, a first contoured bar end and a second contoured bar end on opposite ends of the main bar body;
    wherein the fixed hinge side comprises a molded plastic and comprising a first knuckle, the fixed hinge side molded directly over and encompassing the first contoured bar end such that the first contoured bar end is fixed within and not rotatable relative to the fixed hinge side, and the first knuckle molded directly over and encompassing a portion of the main bar body; and
    wherein the spring loaded side comprises a molded plastic and comprising a second knuckle, the spring loaded side molded directly over and encompassing the second contoured bar end such that the second contoured bar end is fixed within and not rotatable relative to the spring loaded side, and the second knuckle molded directly over and encompassing a portion of the main bar body;
    wherein the fixed hinge side and the spring loaded side are configured to rotate relative to each other along the torsion bar axis, the torsion bar producing a torsional spring torque with the relative rotation of the fixed hinge side and the spring loaded side.

18. An insert molded torsion bar hinge comprising:
  a first hinged element;
  a second hinged element;
  a cylindrical metal torsion bar comprising a main bar body, a portion of which extends along a torsion bar axis, a first contoured bar end and a second contoured bar end on opposite ends of the main bar body;

wherein the first hinged element comprises a molded plastic and a first knuckle, the first hinged element molded directly over and encompassing the first contoured bar end such that the first contoured bar end is fixed within and not rotatable relative to the first hinged element, and the first knuckle molded directly over and encompassing a portion of the main bar body; and wherein the second hinged element comprises a molded plastic and a second knuckle, the second hinged element molded directly over and encompassing the second contoured bar end such that the second contoured bar end is fixed within and not rotatable relative to the second hinged element, and the second knuckle molded directly over and encompassing a portion of the main bar body;

wherein the first hinged element and the second hinged element are aligned coaxially on the torsion bar axis and are configured to rotate relative to each other along the torsion bar axis, the torsion bar producing a torsional spring torque with the relative rotation.

19. The insert molded torsion bar hinge of claim 18, wherein the first and second hinged elements are adjacent each other and wherein the torsion bar is curved such that the torsion bar extends from the first hinged element through the second hinged element and then curves back into the second hinged element.

* * * * *